United States Patent
Rosenhouse et al.

(10) Patent No.: US 10,382,139 B2
(45) Date of Patent: Aug. 13, 2019

(54) POLARIZATION PRE-CODING FOR A SINGLE CARRIER COMMUNICATION SYSTEM

(71) Applicant: Ceragon Networks Ltd., Tel-Aviv (IL)

(72) Inventors: Isaac Rosenhouse, Kiryat-Ono (IL); Oz Harel, Tel-Aviv (IL); Haggai Mizrahi, Hod-HaSharon (IL); David Heller, Givat Shmuel (IL); Gur Ballas, Tel-Mond (IL)

(73) Assignee: Ceragon Networks Ltd., Tel-Aviv (IL)

( * ) Notice: Subject to any disclaimer, the term of this patent is extended or adjusted under 35 U.S.C. 154(b) by 198 days.

(21) Appl. No.: 15/386,204

(22) Filed: Dec. 21, 2016

(65) Prior Publication Data
US 2018/0176802 A1    Jun. 21, 2018

(51) Int. Cl.
| | |
|---|---|
| *H04B 10/532* | (2013.01) |
| *H04B 7/10* | (2017.01) |
| *H04B 14/00* | (2006.01) |
| *H04B 7/0417* | (2017.01) |
| *H04B 7/06* | (2006.01) |

(52) U.S. Cl.
CPC ......... *H04B 10/532* (2013.01); *H04B 7/0417* (2013.01); *H04B 7/0626* (2013.01); *H04B 7/10* (2013.01); *H04B 14/008* (2013.01)

(58) Field of Classification Search
CPC .... H04B 14/008; H04B 7/002; H04B 7/0469; H04B 7/10; H04B 7/1555; H04B 7/15571; H04B 10/2569; H04B 10/2572; H04B 10/614; H04B 10/615; H04B 10/6151; H04B 10/6162; H04B 10/6166; H04J 14/06
See application file for complete search history.

(56) References Cited

U.S. PATENT DOCUMENTS

| | | | |
|---|---|---|---|
| 8,416,693 B2 | 4/2013 | Vanunu et al. | |
| 8,804,763 B2 | 8/2014 | Yakov et al. | |
| 9,203,484 B2 | 12/2015 | Mizrahi et al. | |
| 2003/0235413 A1* | 12/2003 | Cohen | G02F 1/31 398/43 |
| 2011/0206375 A1* | 8/2011 | Xiong | H04B 10/5165 398/65 |

(Continued)

OTHER PUBLICATIONS

Oguchi "Electromagnetic Wave Propagation and Scattering in Rain and Other Hydrometeors", Proceedings of the IEEE, 71(9): 1029-1078, Sep. 1983.

*Primary Examiner* — Ashley Shivers

(57) ABSTRACT

A method for optimizing reception of a polarized single-carrier transmission, including transmitting a polarized single-carrier transmission to a receiver, receiving feedback from the receiver of a figure of merit of the polarized single-carrier transmission, and electronically changing polarization of the polarized single-carrier transmission based on the feedback. A single-carrier communication transmitter including a source for a polarized single-carrier transmission signal, a circuit for receiving feedback from a receiver describing a figure of merit of a received polarized single-carrier transmission, and a circuit for changing polarization of the polarized single-carrier transmission signal, based on the feedback. Related apparatus, systems and methods are also described.

14 Claims, 13 Drawing Sheets

(56) References Cited

U.S. PATENT DOCUMENTS

| | | | |
|---|---|---|---|
| 2012/0093100 A1* | 4/2012 | Qin | H04B 7/10 370/329 |
| 2014/0362701 A1* | 12/2014 | Roh | H03M 13/2966 370/235 |
| 2015/0382214 A1* | 12/2015 | Cheng | H04W 24/08 370/252 |
| 2016/0233944 A1* | 8/2016 | Viswanathan | H04B 7/10 |
| 2017/0033847 A1* | 2/2017 | Lomayev | H04B 7/0413 |

* cited by examiner

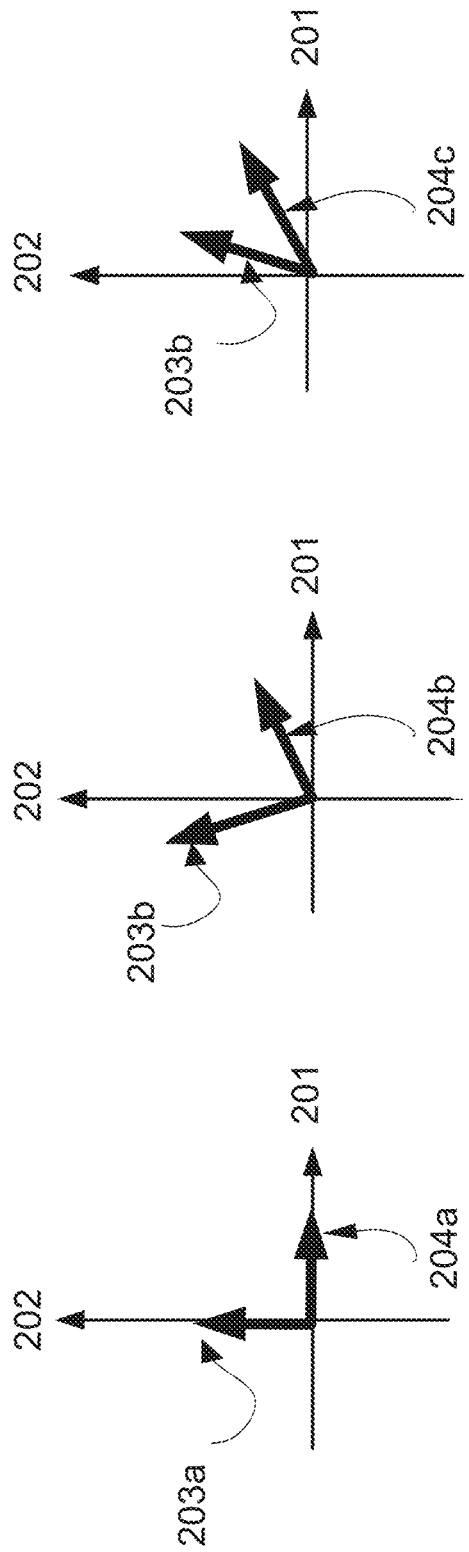

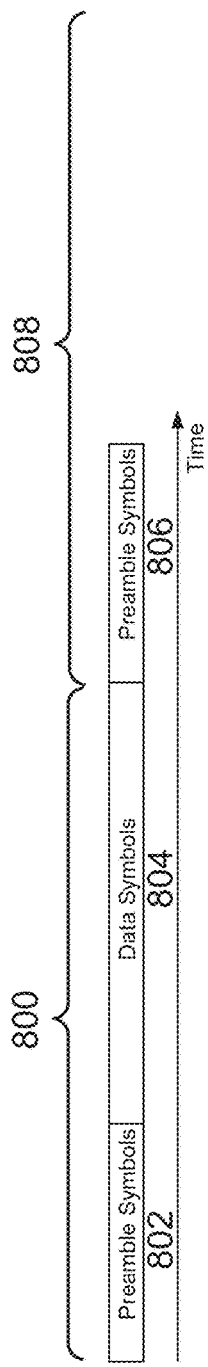
FIGURE 8
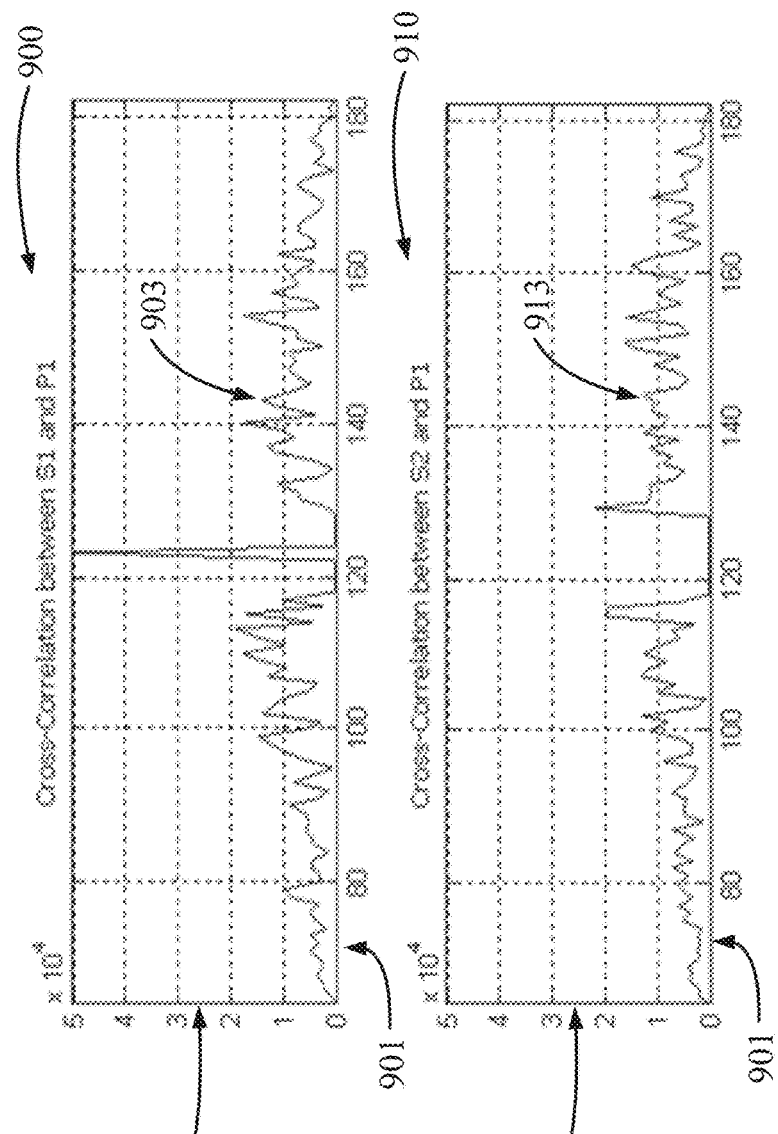
FIGURE 9A
FIGURE 9B

POLARIZATION PRE-CODING FOR A SINGLE CARRIER COMMUNICATION SYSTEM

FIELD AND BACKGROUND OF THE INVENTION

The present invention, in some embodiments thereof, relates to a polarized single carrier communication system and, more particularly, but not exclusively, to a dual polarization single carrier communication link operating in a Non-Line-Of-Sight (NLOS) mode.

Background art includes:
U.S. Pat. No. 9,203,484;
U.S. Pat. No. 8,804,763;
U.S. Pat. No. 8,416,693; and
an article by Tomohiro Oguchi, titled: "Electromagnetic Wave Propagation and Scattering in Rain and Other Hydrometeors", published in Proceedings of the IEEE, Vol. 71, no. 9, September 1983.

The disclosures of all references mentioned above and throughout the present specification, as well as the disclosures of all references mentioned in those references, are hereby incorporated herein by reference.

SUMMARY OF THE INVENTION

Polarized transmission is commonly used, and polarized reception is used to receive the polarized transmission. However, a polarized signal may be rotated or the polarization may become less pronounced, by atmospheric conditions, which come and go. None-line-of-sight (NLOS) polarized transmissions may also be affected by objects in the environment, such as lakes and/or buildings.

An aspect of the invention relates to determining a transmission polarization by setting coefficients for transmitter pre-coders. Such a scheme for determining polarization potentially provides several benefits: the polarization can change dynamically, potentially following dynamically changing meteorological conditions and/or other changes in the environment, such as new buildings, floods, etc.

An aspect of the invention relates to determining transmission polarization based on feedback of signal quality from a receiver, potentially optimizing polarization of a transmitted signal and/or transmitted signals in a dual polarization system to improve reception quality, communication throughput or other figures of merit.

An aspect of the invention relates to splitting data between transmission polarizations based on feedback of signal quality from a receiver, potentially optimizing splitting the data among polarizations to improve total communication rate.

According to an aspect of some embodiments of the present invention there is provided a method for optimizing reception of a polarized single-carrier transmission, including transmitting a polarized single-carrier transmission to a receiver, receiving feedback from the receiver of a figure of merit of the polarized single-carrier transmission, and electronically changing polarization of the polarized single-carrier transmission based on the feedback.

According to some embodiments of the invention, the changing polarization is performed by multiplying a vector T, of values to be transmitted, by a rotation matrix D.

According to some embodiments of the invention, the polarized single-carrier transmission includes a single stream of data transmitted at a specific polarization.

According to some embodiments of the invention, the polarized single-carrier transmission includes a two streams of data transmitted at two different polarizations.

According to some embodiments of the invention, the changing polarization of the polarized single-carrier transmission based on the feedback includes multiplying values to be transmitted, represented by a vector T, by a matrix P, where rows of P are eigenvectors associated with a Singular Value Decomposition (SVD) of a matrix H included in feedback data from the receiver, the matrix H being defined by R=H·T+n, where T is a vector representing a transmitted signal, R is a vector representing a signal received by the receiver, and n is a vector representing additive noise.

According to some embodiments of the invention, the changing polarization of the polarized single-carrier transmission based on the feedback includes multiplying values to be transmitted, represented by a vector T, by a matrix P, where $$\underline{P} = \begin{pmatrix} \cos(\alpha) \cdot e^{i\varphi} & \sin(\alpha) \cdot e^{i\varphi} \\ -\sin(\alpha) & \cos(\alpha) \end{pmatrix}, \text{ and}$$

$$\tan(\varphi) = -\frac{r_1 \sin(\theta_1) + r_2 \sin(\theta_2)}{r_1 \cos(\theta_1) + r_2 \cos(\theta_2)},$$

where $\alpha$ is an angle by which the polarization is rotated, $\varphi$ is a measure of mixing of perpendicular components, $r_1 = |h_{12}^* h_{11}|$, where $h_{ij}$ is a component of a channel matrix H, $r_2 = |h_{22}^* h_{22}|$, $\theta_1 = \text{phase}\{h_{12}^* h_{11}\}$, and $\theta_2 = \text{phase}\{h_{22}^* h_{21}\}$.

According to some embodiments of the invention, the changing polarization of the polarized single-carrier transmission based on the feedback includes multiplying values to be transmitted, represented by a vector T, by a matrix P, where $$\underline{P} = \begin{pmatrix} \cos(\alpha) \cdot e^{i\varphi} & \sin(\alpha) \cdot e^{i\varphi} \\ -\sin(\alpha) & \cos(\alpha) \end{pmatrix}, \text{ and}$$

$$\tan(2\alpha) = -\frac{2(Re\{h_{11}^* h_{12} e^{-i\varphi}\} + Re\{h_{21}^* h_{22} e^{-i\varphi}\})}{(|h_{11}|^2 - |h_{12}|^2 + |h_{21}|^2 - |h_{22}|^2)}$$

$\alpha$ is an angle by which the polarization is rotated, $\varphi$ is a measure of mixing of perpendicular components, and $h_{ij}$ is a component of a channel matrix H.

According to some embodiments of the invention, the changing polarization of the polarized single-carrier transmission based on the feedback includes multiplying values to be transmitter represented by a vector T, by a matrix P $$P = \begin{pmatrix} \cos(\alpha) \cdot e^{i\varphi} & \sin(\alpha) \cdot e^{i\varphi} \\ -\sin(\alpha) & \cos(\alpha) \end{pmatrix},$$

$$\tan(\varphi) = -\frac{r_1 \sin(\theta_1) + r_2 \sin(\theta_2)}{r_1 \cos(\theta_1) + r_2 \cos(\theta_2)}, \text{ and}$$

$$\tan(2\alpha) = -\frac{2(Re\{h_{11}^* h_{12} e^{-i\varphi}\} + Re\{h_{21}^* h_{22} e^{-i\varphi}\})}{(|h_{11}|^2 - |h_{12}|^2 + |h_{21}|^2 - |h_{22}|^2)}$$

Where $\alpha$ is an angle by which the polarization is rotated, $\varphi$ is a measure of mixing of perpendicular components, $r_1 = |h_{12}^* h_{11}|$, where $h_{ij}$ is a component of a channel matrix H, $r_2 = |h_{22}^* h_{22}|$, $\theta_1 = \text{phase}\{h_{12}^* h_{11}\}$, and $\theta_2 = \text{phase}\{h_{22}^* h_{21}\}$.

According to some embodiments of the invention, the values of $\varphi$ and $\alpha$ are set iteratively, such that for iteration n $$\varphi^{(n)} = \varphi^{(n-1)} - \mu_\varphi \cdot \frac{\text{sign}\{r_1^{(n)}\sin(\theta_1^{(n)}) + r_1^{(n)}\sin(\theta_2^{(n)})\}}{\text{sign}\{r_1^{(n)}\cos(\theta_1^{(n)}) + r_2^{(n)}\cos(\theta_2^{(n)})\}}, \text{ and}$$

$$\alpha^{(n)} = \alpha^{(n-1)} - \mu_\alpha \cdot \frac{\text{sign}\{Re\{h_{11}^{*(n)}h_{12}^{(n)}e^{-i\varphi(n)}\} + Re\{h_{21}^{*(n)}h_{22}^{(n)}e^{-i\varphi(n)}\}\}}{\text{sign}\{|h_{11}^{(n)}|^2 - |h_{12}^{(n)}|^2 + |h_{21}^{(n)}|^2 - |h_{22}^{(n)}|^2\}}$$

where $\mu\varphi$ is a step size of the value $\varphi$, and $\mu\alpha$ is a step size of the value $\alpha$.

According to some embodiments of the invention, (a) $\varphi$ and $\alpha$ receive initial values, (b) multiplying the vector T by the matrix P, (c) at the receiver separating components of a received signal, (d) evaluating quality measures of each one of the separated components, (e) providing the quality measures as input to a search method, (f) updating at least one of $\varphi$ and $\alpha$.

According to some embodiments of the invention, further including maximizing a value C defined as follows $C = \max_{Q;\{Q\} \leq P_T}\{\log_2(\det(I+\rho HQH^H))\}$ where
$Q$ is $=P^H P$, and $P_T$ is a measure of transmitted power.

According to some embodiments of the invention, the transmitting a polarized single-carrier transmission to the receiver includes transmitting over a None-Line-Of-Sight channel.

According to an aspect of some embodiments of the present invention there is provided a single-carrier transmitter using the method for optimizing reception described above.

According to an aspect of some embodiments of the present invention there is provided a single-carrier communication system using the method for optimizing reception described above.

According to an aspect of some embodiments of the present invention there is provided a single-carrier communication transmitter including a source for a polarized single-carrier transmission signal, a circuit for receiving feedback from a receiver describing a figure of merit of a received polarized single-carrier transmission, and a circuit for changing polarization of the polarized single-carrier transmission signal, based on the feedback.

According to an aspect of some embodiments of the present invention there is provided a single-carrier communication system including a receiver for receiving a polarized single-carrier transmission signal, including a circuit for determining a figure of merit of the received polarized single-carrier transmission signal, and a circuit for transmitting feedback including data describing the figure of merit, and a transmitter including a circuit for receiving the feedback from the receiver, a source for a polarized single-carrier transmission signal, a circuit for changing polarization of the polarized single-carrier transmission signal, based on the feedback, producing a changed polarization single-carrier transmission signal, and a circuit for transmitting the changed polarization single-carrier transmission signal to the receiver.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL
VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a simplified drawing of None Line Of Sight (NLOS) communication links;

FIGS. 2A-C are simplified illustrations of three instances of received signals which were transmitted polarized along vertical and horizontal axes;

FIGS. 3A-B are simplified illustrations of two instances of received signals which were transmitted polarized along vertical and horizontal axes;

FIG. 8 is a simplified illustration of a data frame including preamble symbols and data symbols according to an example embodiment of the invention;

FIG. 9A is a graph of a cross-correlation between a preamble symbol sequence S1 and a corresponding symbol sequence P1 used by a receiver according to an example embodiment of the invention;

FIG. 9B is a graph of a cross correlation between a preamble symbol sequence S2 and a symbol sequence P1 according to an example embodiment of the invention;

DESCRIPTION OF SPECIFIC EMBODIMENTS OF THE INVENTION

Figure 1:
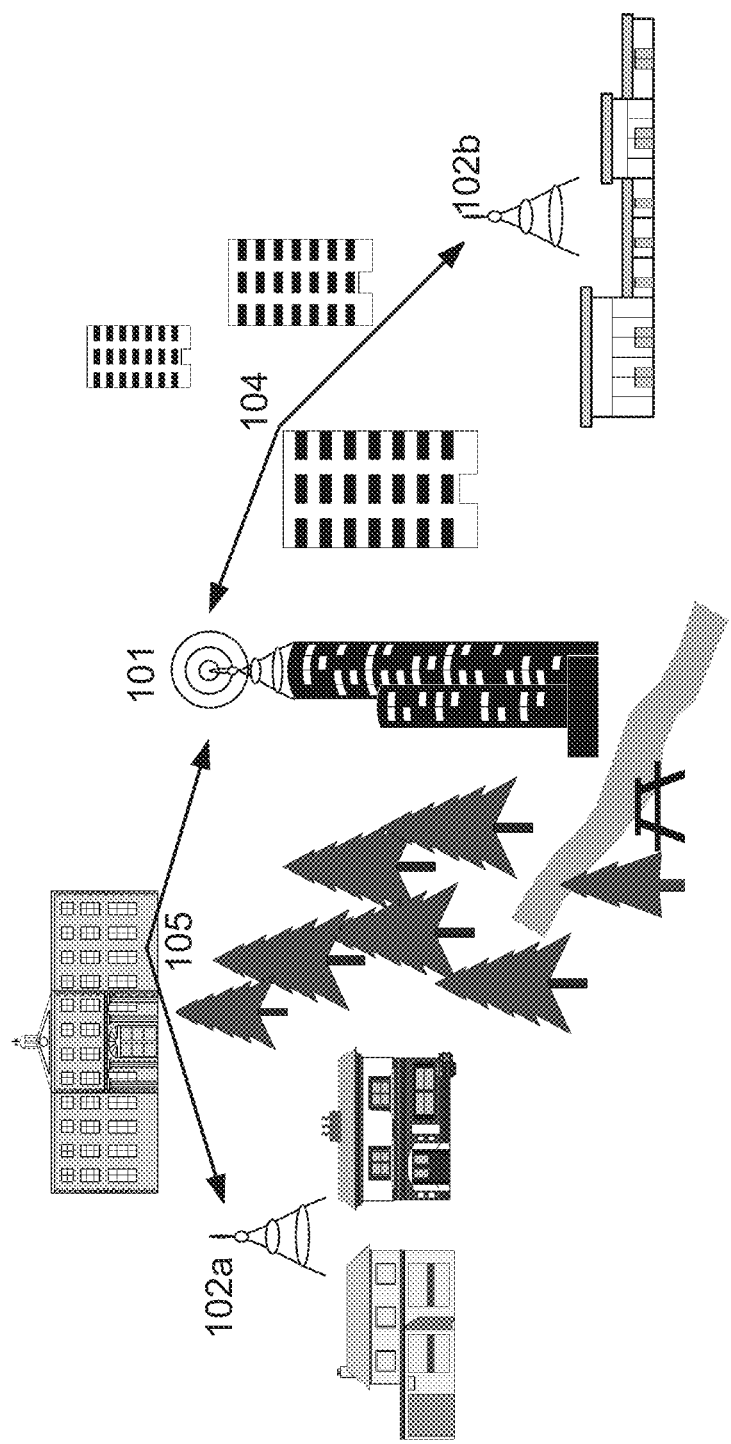

The present invention, in some embodiments thereof, relates to a polarized single carrier communication system and, more particularly, but not exclusively, to a polarized single carrier communication link operating in a Non-Line-Of-Sight (NLOS) mode.

The term "polarized communication system" in all its grammatical forms is used throughout the present specification and claims to mean a communication system that uses one or more polarizations to communicate.

Cellular backhaul systems in microwave and millimeter waves are required to provide high availability throughout the year. They are therefore regulated in order to avoid interference, and are carefully positioned and steered during installation.

Often, dual polarization (vertical and horizontal) systems are employed in order to double the capacity per link. A common practice includes aligning the polarization axes at both ends of the link. Such a process adds to the complexity of the installation. Moreover, despite careful installation the two polarized signals may mix with each other even in line-of-site (LOS) scenarios due to atmospheric events such as rain storms and due to imperfect antennas. The mixture might not be symmetric, that is, one polarization might be "contaminated" by the other to a different extent than the contamination of the other polarization. In a below-referenced article by article by Tomohiro Oguchi it is demonstrated that for a 30 GHz 1 km link during a heavy rain of 100 mm/hour and a side wind that rotates the drops by 5 degrees, the amount of H-polarized signal that is received as a V polarization may be 5 dB higher than the amount of V-polarized signal that is received as H polarization.

An aspect of the invention relates to transmitting a polarized transmission in a polarization angle which improves quality and/or data transmission capacity of the transmission.

An aspect of the invention relates to performing polarized transmission between a transmitting antenna and a receiving antenna. The polarization direction is optionally not simply set to be vertical and/or horizontal, but set to be at some specific angle, such as by measuring quality of the communication link and selecting a direction which improves quality. The quality is optionally measured dynamically, over time, and the polarization direction is optionally changed over time. The quality is optionally measured by measuring some quality measure of a received signal at the receiver.

An aspect of the invention relates to determining optimal polarization(s) to use in transmission.

In some embodiments, signals in two different polarizations are transmitted, a communication channel is characterized, and an optimal polarization(s) is determined.

In some embodiments, even in order to transmit in a single optimized polarization, two polarizations are transmitted, and the communication channel is characterized to find the optimal polarization.

In some embodiments searching for an optimal polarization in a single polarization system is optionally performed by varying the polarization until an optimal performance is achieved.

An aspect of the invention relates to performing transmission polarization by setting coefficients for transmitter pre-coders. Such polarization potentially provides several benefits: the polarization can change dynamically, potentially following dynamically changing meteorological conditions and/or other changes in the environment, such as new buildings, floods, etc.

An aspect of the invention relates to performing transmission polarization based on feedback of signal quality from a receiver, potentially optimizing polarization of a transmitted signal to improve reception.

An aspect of the invention relates to dividing data bandwidth between transmission polarizations based on feedback of signal quality from a receiver, potentially optimizing dividing the data bandwidth among polarizations to improve total bandwidth.

An aspect of the invention relates to characterizing an effect (H) of a communication link, or communication channel, on a transmitted signal (T), producing a received signal (R).

For purposes of better understanding some embodiments of the present invention, reference is first made to FIG. 1, which is a simplified drawing of None Line Of Sight (NLOS) communication links.

Recently, in order to improve the coverage of cellular networks, it has been suggested to deploy small cell stations to assist macro-cell stations, or base stations. Such small cells extend the reach of the base stations. Providing service to the small cells might sometime require a non-line-of-sight (NLOS) communication link. As an example—reflection from a building or diffraction over a building corner may be required to establish the link. These situations are demonstrated in FIG. 1.

FIG. 1 depicts a base station antenna 101, communicating via a first communication link 105 with a small cell antenna 102a, and via a second communication link 104 with a small cell antenna 102b. In the first communication link 105 reflection, for example off a building, occurs. In the second communication link 104 diffraction, for example between buildings, occurs.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

NLOS links may increase the mixing between different polarizations. Several cases of polarization mixing are described below with reference to FIGS. 2A-C.

Reference is now made to FIGS. 2A-C, which are simplified illustrations of three instances of received signals which were transmitted polarized along vertical and horizontal axes.

FIGS. 2A-C depicts vertically polarized signals 203a 203b 203c and horizontally polarized signals 204a 204b 204c against a vertical axis 202 and a horizontal axis 201.

FIG. 2A demonstrates no polarization rotation, that is, the horizontally polarized signals 204a is received along the horizontal axis 201 and the vertically polarized signals 203a is received along the vertical axis 202.

FIG. 2B demonstrates a constructive polarization rotation, where each of the transmitted signals 203b 204b is received partly in a horizontal polarization and partly in a vertical polarization; however, the received signals 203b 204b remain orthogonal to each other.

FIG. 2C demonstrates a destructive polarization rotation in which the received signals 203c 204c are not orthogonal to each other. When a receiver isolates the received signals 203c 204c their individual signal-to-noise-ratio (SNR) values are generally reduced. When reducing a component of the other polarization, part of a desired polarization component is also reduced.

The instance demonstrated in FIG. 2C is also termed polarization mixing.

Each of the different polarization signals may arrive at a different power level. Such a situation is demonstrated in FIGS. 3A-B.

Figure 3B:
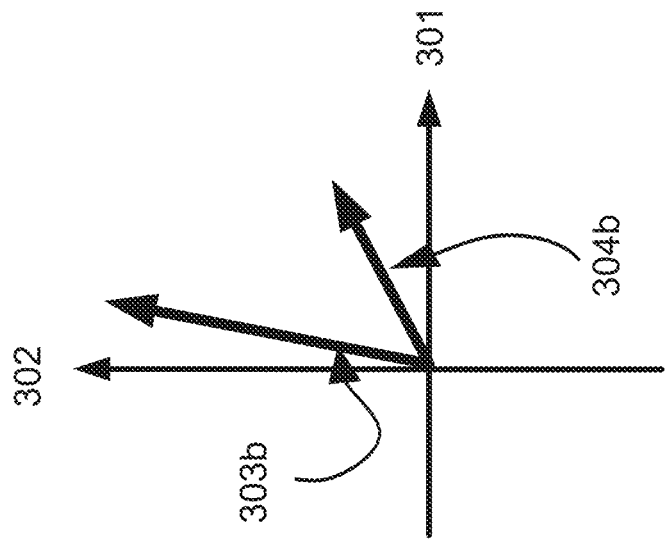
Figure 3A:
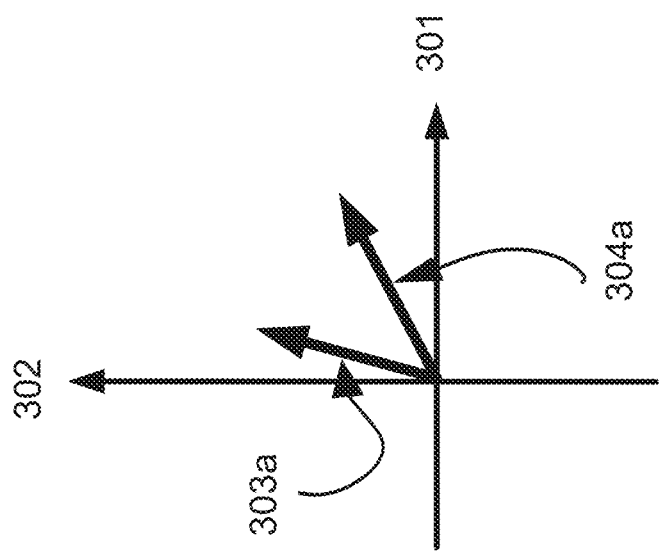

Reference is now made to FIGS. 3A-B, which are simplified illustrations of two instances of received signals which were transmitted polarized along vertical and horizontal axes.

FIGS. 3A-B depict vertically polarized signals 303a 303b and horizontally polarized signals 304a 304b against a vertical axis 302 and a horizontal axis 301.

FIG. 3A demonstrates a destructive polarization rotation in which the received signals 303a 304a are not orthogonal to each other, yet are received by a receiver at approximately equal power.

FIG. 3B demonstrates a destructive polarization rotation in which the received signals 303b 304B are not orthogonal to each other, and are received by a receiver at different powers.

It is noted that polarization mixing may depend on frequency, in other words, polarization mixing may be dispersive. Different frequency components of transmitted signals may undergo different polarization mixing, especially in NLOS conditions.

It is noted that wireless links, and specifically NLOS links, are dynamic in nature. They tend to change over time in response to weather and season changes and environmental development.

It is noted that it may be beneficial to adapt a dual polarization scheme to characteristics of the communication channel.

It is noted that it is generally preferable to communicate more information along a polarization direction which is favored by a communication channel. In some cases a less favorable polarization direction may be so weak that it may be preferable to avoid using the less favorable polarization direction, for example so as not to interfere with communications along the more favorable polarization direction.

Figure 4:
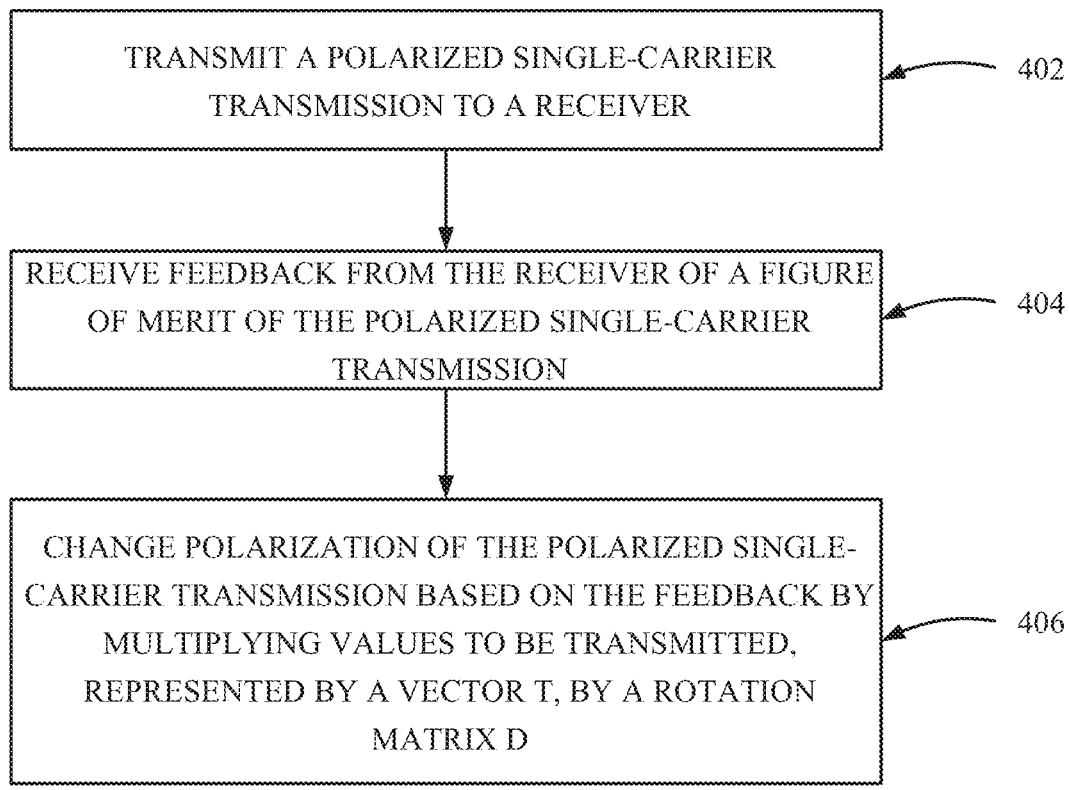
FIG. 4 is a simplified flow chart illustration of a method for optimizing reception of a polarized single-carrier transmission according to an example embodiment of the invention.

Reference is now made to FIG. 4 which is a simplified flow chart illustration of a method for optimizing reception of a polarized single-carrier transmission according to an example embodiment of the invention.

The method of FIG. 4 includes:

transmitting a polarized single-carrier transmission to a receiver (402);

receiving feedback from the receiver of a figure of merit of the polarized single-carrier transmission (404); and changing polarization of the polarized single-carrier transmission based on the feedback by multiplying values to be transmitted, represented by a vector T, by a rotation matrix D (406).

In some embodiments the feedback from the receiver includes a channel response matrix, and the changing polarization of the polarized single-carrier transmission includes calculating the matrix $\underline{H}$ defined in Equation 2 below, and calculating matrix D based on the matrix $\underline{H}$.

Figure 5:
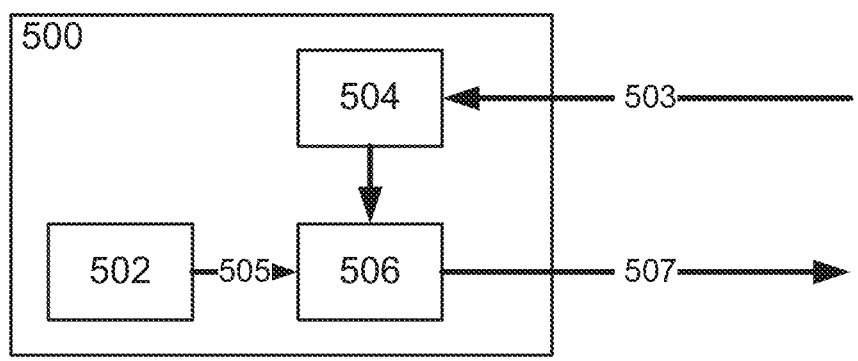
FIG. 5 is a simplified illustration of a single-carrier communication transmitter according to an example embodiment of the invention.

Reference is now made to FIG. 5 which is a simplified illustration of a single-carrier communication transmitter 500 according to an example embodiment of the invention.

FIG. 5 depicts the single-carrier communication transmitter 500 which includes a source 502 for a polarized single-carrier transmission signal 505; a circuit 504 for receiving feedback 503 from a receiver (not shown) providing figure of merit for channel which carries the polarized single-carrier transmission signal; and a circuit 506 for changing polarization of the polarized single-carrier transmission signal 505, based on the feedback 503, producing a polarized and optionally rotated single-carrier transmission signal 507.

Figure 6:
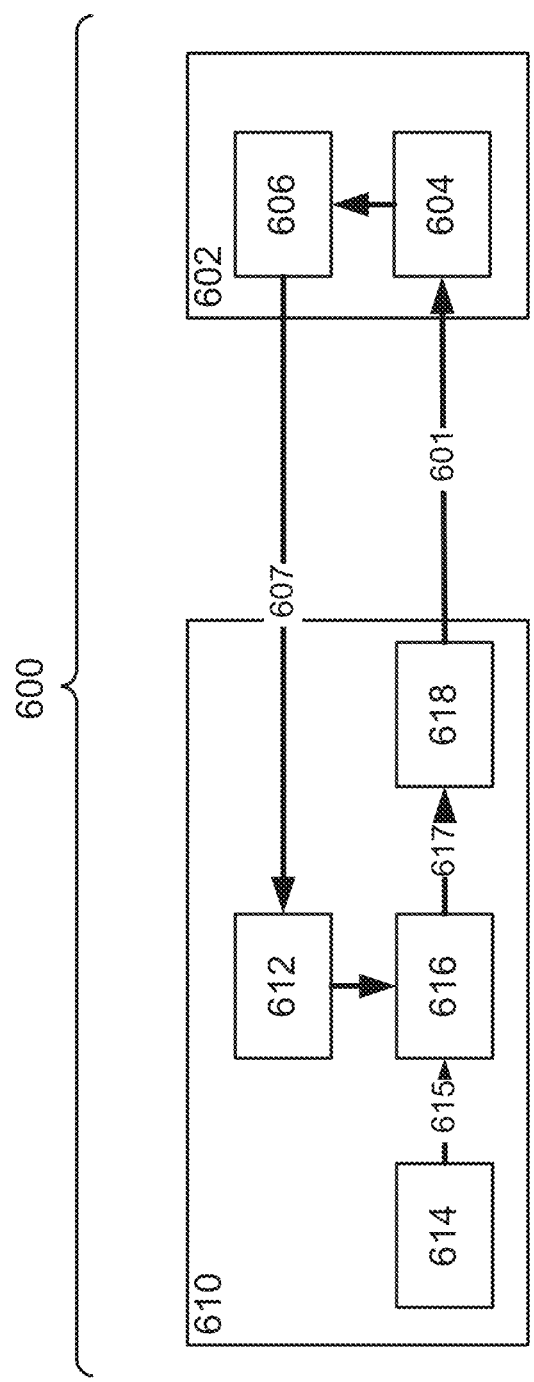
FIG. 6 is a simplified illustration of a single-carrier communication system according to an example embodiment of the invention.

Reference is now made to FIG. 6 which is a simplified illustration of a single-carrier communication system 600 according to an example embodiment of the invention.

FIG. 6 depicts:

a receiver 602 for receiving a polarized single-carrier transmission signal 601, including a circuit 604 for determining quality of the received polarized single-carrier transmission signal 601; and a circuit 606 for transmitting feedback 607 comprising data describing the quality, and a transmitter 610 including a circuit 612 for receiving the feedback 607 from the receiver 602; a source 614 for a polarized single-carrier transmission signal 615; a circuit 616 for changing polarization of the polarized single-carrier transmission signal 615, based on the feedback 607, producing a changed polarization single-carrier transmission signal 617; and a circuit 618 for transmitting the changed polarization single-carrier transmission signal 601 to the receiver 602.

In some embodiments the a circuit 604 calculating the matrix $\underline{H}$ defined in Equation 2 below, and calculating matrix D based on the matrix $\underline{H}$, the feedback 607 includes the matrix $\underline{H}$, the circuit 616 for computes the matrix D based on the feedback 607, and produces the changed polarization single-carrier transmission signal 617 using the matrix D.

An aspect of the invention relates to splitting data to be transmitted among two transmitted signals, each of which has a different polarization. Therefore, the stream of data is first split into two streams, and a polarization pre-coder mixes the two streams among two transmission polarizations. Feedback from a receiver optionally provides information about a polarization-dependent impulse response or frequency response of the communication channel, as well as information about the supported communication rate, for each one of the data streams/polarizations.

Figure 7:
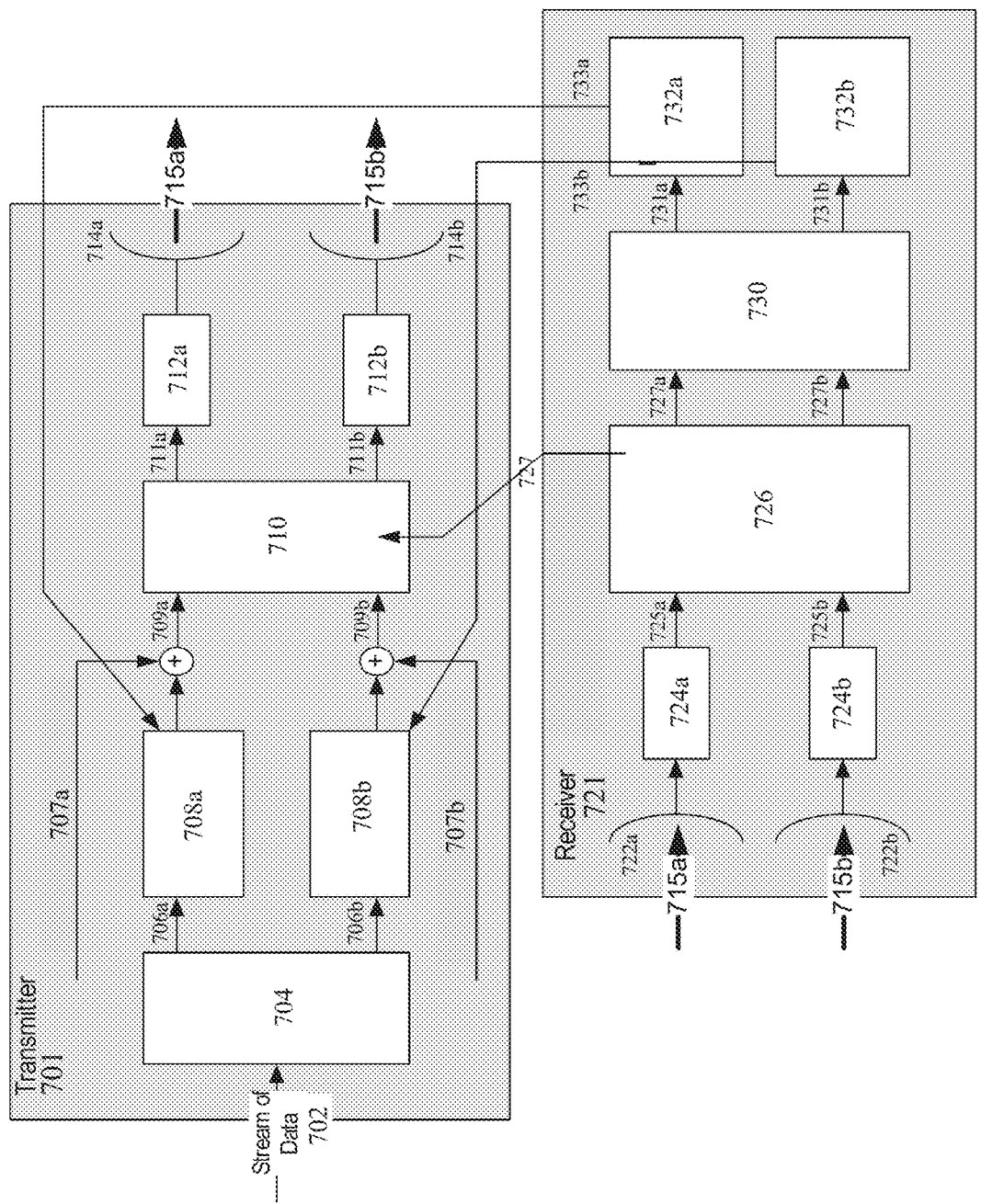
FIG. 7 is a simplified block diagram illustration of an example embodiment of the invention.

Reference is now made to FIG. 7, which is a simplified block diagram illustration of an example embodiment of the invention.

FIG. 7 depicts a transmitter and a receiver using precoding filters to determine polarization angles of transmitted signals according to an example embodiment of the invention.

A transmitter 701 receives a stream of data 702 to be transmitted is split by a multi radio interface 704 into two streams 706a 706b. The splitting may be implemented, by way of a non-limiting example, as described in U.S. Pat. No. 8,804,763 titled "Transmission of Data over Parallel Links". Each of the streams 706a 706b is modulated and coded separately by a modulator and coder 708a 708b according to an allowable communication rate as received from a receiver 721. Implementation may be carried out, by way of a non-limiting example, as described in U.S. Pat. No. 8,416,693, "Errorless and Hitless Variable Data Rate Communication."

The two streams 706a 706b are arranged in frames and padded periodically by unique sequences of symbols, producing output of two streams 709a 709b. (Each stream 709a 709b has its own unique sequence 707a 707b). The sequences 707a 707b are referred to as preamble sequences. The sequences 707a 707b may optionally be identified by receiver(s) and may be used by the receiver(s) to estimate an impulse response of the channel. The frames are optionally synchronized in time such that both preamble sequences 707a 707b are transmitted simultaneously.

The streams 709a 709b are fed into a pre-coding filters unit 710, which optionally determines the polarization of the streams, producing polarized signals 711a 711b. The polarized signals 711a 711b are fed to transmitters 712a 712b for each one of the polarizations, and from there to antennas 714a 714b, which transmit polarized signals 715a 715b to the receiver 721.

The receiver 721 receives the transmitted polarized signals 715a 715b at antennas 722a 722b, which pass the received signals to down-converters 724a 724b. The down-converters 724a724b produce output of baseband I and Q signals 725a 725b, which enters a unit 726 for producing feedback which may optionally be used for updating the pre-coding filters in the pre-coding filters unit 710.

The unit 726 for producing feedback optionally produces the feedback based on received preamble sequences, and optionally calculates a quality measure of the communication channel, either as a total of the two polarizations, or for each polarization separately. An arrow 727 depicts the optional feedback, although the feedback is actually part of data transmitted from the receiver 721 to the transmitter 701, and not necessarily a direct connection between the unit 726 in the receiver 721 and the pre-coding filters unit 710 in the transmitter 710.

The signals 725a 725b are also passed to a unit 730 containing adaptive filters, which optionally performs zero-forcing as described elsewhere herein.

In some embodiments the unit 730 containing adaptive filters produces output signals 731a 731b, which enters units 732a 732b, which decode the output signals 731a 731b and optionally produce feedback 733a 733b for updating an ACM (Adaptive Coding and Modulation) profile of the transmitter 701. The feedback 733a 733b is transmitted to the transmitter 701, for optional use by the modulator and coder 708a 708b. As mentioned above with respect to the feedback for the pre-coding filters, the feedback 733a 733b is actually part of data transmitted from the receiver 721 to the transmitter 701.

Reference is now additionally made to FIG. 8, which is a simplified illustration of a data frame 800 including preamble symbols 802 and data symbols 804 according to an example embodiment of the invention.

FIG. 8 demonstrates the frame 800 structure, with preamble symbols 802 at a beginning of the frame, data symbols 804 following, followed by preamble symbols 806 of a next frame 808.

The preamble symbol sequences may be selected as described in U.S. Pat. No. 9,203,484 titled "Using Sequences for Symbol Timing Synchronization in Single-Carrier MIMO Communication Systems".

Reference is now additionally made to FIG. 9A, which is a graph 900 of a cross-correlation between a preamble symbol sequence S1 and a corresponding symbol sequence P1 used by a receiver according to an example embodiment of the invention.

The graph 900 has an X-axis 901 depicting time, and a Y-axis 902 depicting magnitude of correlation values.

A line 903 depicts the cross-correlation between S1 and P1.

The correlation values are discrete in time, and the line 903 depicted in FIG. 9A is a line which passes approximately through the symbol values.

Reference is now made to FIG. 9B, which is a graph 910 of a cross correlation between a preamble symbol sequence S2 and a symbol sequence P1 according to an example embodiment of the invention.

The graph 910 has an X-axis 901 depicting time, and a Y-axis 902 depicting magnitude of symbol values.

A line 913 depicts the cross-correlation between S2 and P1.

The correlation values are discrete, and the line 913 depicted in FIG. 9B is a line which passes approximately through the symbol values.

The graphs in FIGS. 9A and 9B demonstrate that it is possible to estimate an impulse response of a channel between a transmitter transmitting a preamble sequence S1 and a receiver which performs a correlation with P1, while eliminating interference from a sequence S2. Similarly, (not shown in a figure) we may estimate an impulse response between a transmitter transmitting S2, for example on a differently polarized signal, and the receiver.

In some embodiments, one or more of the following technical features are maintained for estimating impulse response of a dual-polarization channel at a receiving side.
  Transmitted frames in both polarizations are synchronized in terms of symbol clock rate, start of frame timing and carrier phase.
  The clock and frame timing synchronization act to enable the two preamble sequences to be received simultaneously at a receiver, potentially enabling simple channel estimation
  Carrier synchronization enables sending pre-coded streams over two polarizations and combining received signals at a receiver in a synchronized manner.
  In some embodiments synchronization is obtained physically, by sharing a clock signal or a carrier source. In some embodiments synchronization is obtained by mechanisms which compensate for lack of a physical connection. Synchronization may be solved by techniques known to a person skilled in the art.
  A feedback channel is maintained, via which a receiver may inform a transmitter about the impulse response, or frequency response, of a channel from each transmitted polarization to each received polarization.

As described in above-mentioned U.S. Pat. No. 9,203,484, if two preamble sequences S1 and S2 are selected wisely they may be correlated with corresponding sequences P1 and P2 in a receiver in such a way that one correlation results in a sequence of zeros for a range of consecutive lags, and another correlation results in a sequence of consecutive zeros except for a single lag within the sequence. Such a situation is depicted in FIGS. 9A and 9B.

The graphs 900 910 in FIGS. 9A-9B demonstrate estimating an impulse response of a channel between a transmitter of a preamble sequence S1 and a receiver which performed correlation with a symbol sequence P1, while eliminating interference by sequence S2. Similarly, (not shown in a figure) an impulse response between a transmitter of a preamble symbol sequence S2 and a receiver may be estimated.

In some embodiments, there is a difference between scenarios described in U.S. Pat. No. 9,203,484, which describes Line of Sight MIMO (multiple in multiple out) communications, and some scenarios described herein— Dual Polarization in a Non-Line-of-Sight scenario.

The different scenarios impose different channel matrices:

In the line-of-sight scenario, since there is a line of sight between a transmitting end and a receiving end, a channel matrix can be modeled as having unity gain elements with different phases.

On the other hand, in Dual Polarization in a Non-Line-of-Sight scenario gain of different elements of the channel matrix may be different.

In some embodiments, as described from here on, it is assumed that impulse response data includes information about gain as well as shape of the channel.

For continued explanation of example embodiments the following definition of a channel will be used.

In some embodiments a channel described herein connects signals in two polarizations at the transmission side with signals in two polarizations in the receiving side. It is noted that in some embodiments a channel may connect a signal in one polarization at the transmission side with a signal in one polarization in the receiving side, which is a reduction of the above two-polarization example which a person skilled in the art will understand.

The two polarizations need not necessarily be vertical and horizontal polarizations. They can be directed along diagonals. Moreover, the two polarizations need not be linear polarizations. The two polarizations may be right circular and left circular polarizations, or even more generally— right elliptic and left-elliptic polarizations. Finally, the two polarizations need not be orthogonal, as long as the two polarizations span a two dimensional polarization-space.

A channel in general may depend on frequency. A first assumption is that the dependence is weak, or alternatively, that the channel is narrow band and as such variations with frequency may be neglected. Later on a description will be provided which does depend on frequency.

Mathematical Representation of a Communication Channel

A channel may be represented as a matrix connecting a two dimensional transmit vector with a two-dimensional receive vector.

$$\begin{pmatrix} R_V \\ R_H \end{pmatrix} = \begin{pmatrix} H_{11} & H_{12} \\ H_{21} & H_{22} \end{pmatrix} \cdot \begin{pmatrix} T_V \\ T_H \end{pmatrix} + \begin{pmatrix} n_V \\ n_H \end{pmatrix} \qquad \text{Equation 1}$$

In Equation 1 the subscripts V and H denote as an example two polarization vectors (Vertical and Horizontal). The Matrix H defines the channel.

Transmitted values are denoted by $T_V$ and $T_H$. $T_V$ and $T_H$ are assumed to have identical power levels. This assumption is often true due to the fact that there is typically a limitation on the transmitted power of the individual signals and not on a sum of the power of the individual signals.

Additive noise terms are denoted by $n_v$ and $n_h$, and are optionally, by way of a non-limiting example, unity-variance independent Gaussian terms.

Received values are denoted by $R_v$ and $R_h$ correspondingly.

For short, matrix notations are used as follows:

$$\underline{R} = \underline{H} \cdot \underline{T} + \underline{n} \qquad \text{Equation 2}$$

The matrix $\underline{H}$ of Equation 2 can be decomposed with Singular Value Decomposition (SVD) as follows:

$$\underline{H} = \underline{U} \cdot \underline{D} \cdot \underline{V}^H \qquad \text{Equation 3}$$

$\underline{U}$ and $\underline{V}$ are rotation matrices and $\underline{D}$ is a diagonal matrix with singular values as follows:

$$D = \begin{pmatrix} \sqrt{\lambda_1} & 0 \\ 0 & \sqrt{\lambda_2} \end{pmatrix} \qquad \text{Equation 4}$$

The parameters $\sqrt{\lambda_1}$ and $\sqrt{\lambda_2}$ are the singular values of the channel matrix, or equivalently, the eigenvalues of $\underline{H}^T\underline{H}$.

In high SNR scenarios, as will be defined later, an optimal solution in terms of total capacity would be inverting the channel matrix (sometimes referred to as a zero-forcing solution) as follows:

$$\hat{\underline{T}} = \underline{H}^{-1} \cdot \underline{R} = \underline{T} + \underline{H}^{-1} \cdot \underline{n} \qquad \text{Equation 5}$$

Equation 5 implies that the estimated values are equal to the transmitted values $\hat{\underline{T}} = \underline{T}$ plus some noise $\underline{H}^{-1} \cdot \underline{n}$.

The noise term after inversion:

$$\tilde{\underline{n}} = \underline{H}^{-1} \cdot \underline{n} \qquad \text{Equation 6}$$

A covariance matrix of the obtained noise is given by:

$$\copyright_{\tilde{n}\tilde{n}} = E\{\tilde{\underline{n}} \cdot \tilde{\underline{n}}^H\} = E\{(\underline{H}^{-1} \cdot \underline{n}) \cdot (\underline{H}^{-1} \cdot \underline{n})^H\} = \underline{H}^{-1} \cdot E\{(\underline{n} \cdot \underline{n}^H)\} \cdot (\underline{H}^{-1})^H = \underline{H}^{-1} \cdot (\underline{H}^{-1})^H = (\underline{H}^H \cdot \underline{H})^{-1} \qquad \text{Equation 7}$$

Using SVD (Singular Values Decomposition) for the channel matrix as defined previously, the covariance matrix of the noise can be expressed as:

$$\underline{C}_{\tilde{n}\tilde{n}} = (\underline{H}^H \cdot \underline{H})^{-1} = (\underline{V} \underline{D}^H \underline{U}^H)(\underline{U} \underline{D} \underline{V}^H))^{-1} = \qquad \text{Equation 8}$$
$$((\underline{V} \underline{D}^H) \cdot (\underline{D} \underline{V}^H))^{-1} = \left(\underline{V} \cdot \begin{pmatrix} \lambda_1 & 0 \\ 0 & \lambda_2 \end{pmatrix} \cdot \underline{V}^H \right)^{-1}$$

Figure 10:
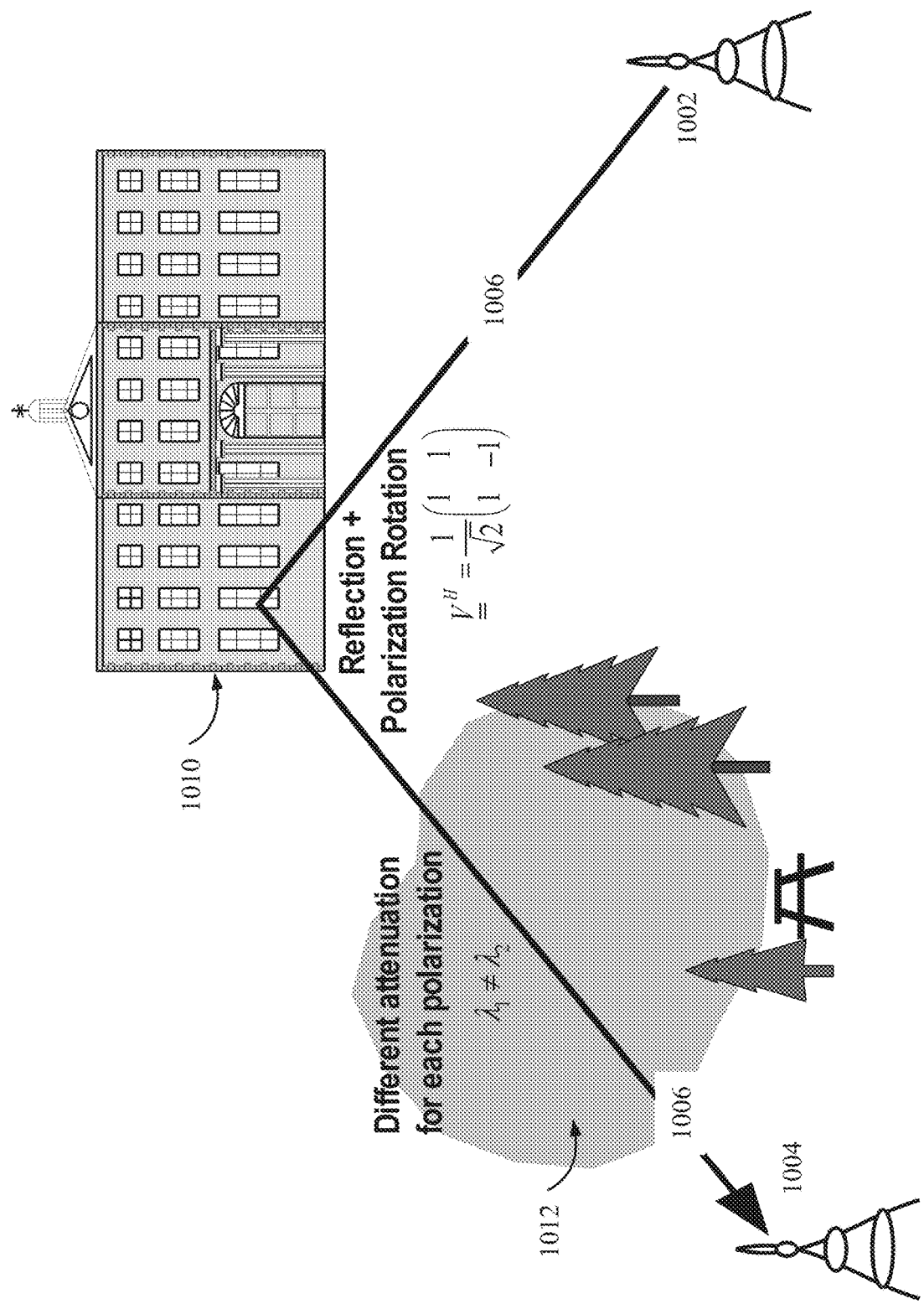
FIG. 10 is a simplified example of an NLOS channel, according to an example embodiment of the invention.

An implication of Equation 8 demonstrated with the following example, depicted in FIG. 10.

Reference is now made to FIG. 10, which is a simplified example of an NLOS channel, according to an example embodiment of the invention.

FIG. 10 depicts a transmission from a transmitter 1002 to a receiver 1004, via an NLOS channel 1006 which, by dint of reflection and polarization rotation off a building 1010, and a different attenuation for different polarizations by dint of passing over a lake 1012.

Effect of the reflection plus polarization rotation may be described by multiplication of a transmitted signal by the following:

$$\underline{V}^H = \frac{1}{\sqrt{2}}\begin{pmatrix} 1 & 1 \\ 1 & -1 \end{pmatrix}.$$

Effect of the different attenuation for different polarizations may be described by multiplication of a transmitted signal by the following: $\lambda_1 \neq \lambda_2$.

If, by way of a non-limiting example, a channel is modeled as shown in FIG. 10, where the matrix $\underline{V}^H$ rotates polarizations by 45 degrees, and the singular values are not equal, ($\sqrt{\lambda_1} \neq \sqrt{\lambda_2}$) the noise covariance matrix would be:

$$\underline{C}_{\tilde{n}\tilde{n}} = \begin{pmatrix} \frac{1}{\lambda_1} + \frac{1}{\lambda_2} & \frac{1}{\lambda_2} - \frac{1}{\lambda_1} \\ \frac{1}{\lambda_2} - \frac{1}{\lambda_1} & \frac{1}{\lambda_1} + \frac{1}{\lambda_2} \end{pmatrix} \quad \text{Equation 8a}$$

Equation 8a implies that if either of the singular values $\sqrt{\lambda_1}$ or $\sqrt{\lambda_2}$ is very small, the noise variance for both polarizations becomes very large. This may not be a desirable situation.

The example of FIG. 10 demonstrates that in some embodiments there may be motivation for separating the communication into two polarizations in a way that if one polarization is attenuated, the attenuated polarization transmission does not adversely affect reception the other polarization, or minimally affects reception the other polarization.

In some embodiments it may be desired to manage communication so that the communication rate is maximized for a given channel matrix.

In some embodiments, optimization may take into consideration a frequency-dependent channel matrix $\underline{H}$.

In some embodiments, power transmitted in each polarization is limited separately. It is noted that limiting power separately in each polarization is a common case in wireless backhaul scenarios.

One or more of the above communication management goals are potentially be achieved by introducing a polarization pre-coder as detailed below.

Pre-Coding with a Rotation Matrix

Transmitted values $\underline{T}$ are a linear combination of data values expressed as a two-dimensional vector $\underline{X}$. in the following description, by way of a non-limiting example, data values are assumed to be independent and have an equal power level.

The linear combination is performed with a pre-coding matrix $\underline{P}$.

$$\underline{T} = \underline{P} \cdot \underline{X} \quad \text{Equation 9}$$

First, a case is described in which the pre-coding matrix is a rotation matrix, and more specifically, the matrix $\underline{V}$ associated with a SVD of the channel matrix, as shown in Equation 3.

$$\underline{P} = \underline{V} \quad \text{Equation 10}$$

A rotation matrix maintains power at each polarization component, and potentially assists in complying with a power limitation requirement.

In some embodiments, rotation and scaling are applied to a received vector by multiplication with a matrix $\underline{D}^{-1} \underline{U}^H$, which is associated with the SVD of the channel matrix. The multiplication corresponds to applying a zero-forcing receiver.

These rotation and scaling operations are expressed mathematically as follows.

$$\underline{R} = \underline{D}^{-1} \underline{U}^H \cdot (\underline{H} \cdot \underline{V} \underline{X} + \underline{n}) \quad \text{Equation 11}$$

Rearranging Equation 11 and using the SVD of the channel matrix provides the following expression for estimation of the transmitted vector:

$$\underline{R} = \underline{D}^{-1} \underline{U}^H \cdot \underline{H} \cdot \underline{V} \underline{X} + \underline{D}^{-1} \underline{U}^H \underline{n} = \underline{D}^{-1} \underline{U}^H \cdot \underline{U} \underline{D} \underline{V}^H \cdot \underline{V} \underline{X} + \underline{D}^{-1} \underline{U}^H \underline{n} = \underline{X} + \underline{D}^{-1} \underline{U}^H \underline{n} = \underline{X} + \tilde{n} \quad \text{Equation 12}$$

Noise covariance is given by:

$$\underline{C}_{\tilde{n}\tilde{n}} = (\underline{D}^H \cdot \underline{D})^{-1} = \begin{pmatrix} \frac{1}{\lambda_1} & 0 \\ 0 & \frac{1}{\lambda_2} \end{pmatrix} \quad \text{Equation 13}$$

Equation 13 implies that the two data values are contaminated by uncorrelated noise elements, each of which may have a different variance. The first data value is immersed in noise with variance of $1/\lambda_1$ and the second data value is immersed in noise with variance of $1/\lambda_1$. Equation 13 teaches a solution which separates mutual dependence that was shown in Equation 8a.

In some embodiments different noise levels potentially imply that each of the data values be modulated differently. The modulation and coding may be adapted to fit the noise level.

Referring now again to FIG. 7, the modulator and coder 708a 708b blocks potentially produce communication rates which are adapted to noise levels of the channel. The pre-coding filters unit 710 performs rotation at the transmitting side, and the adaptive filters unit 730 performs the zero-forcing at the receiving side.

Figure 11:
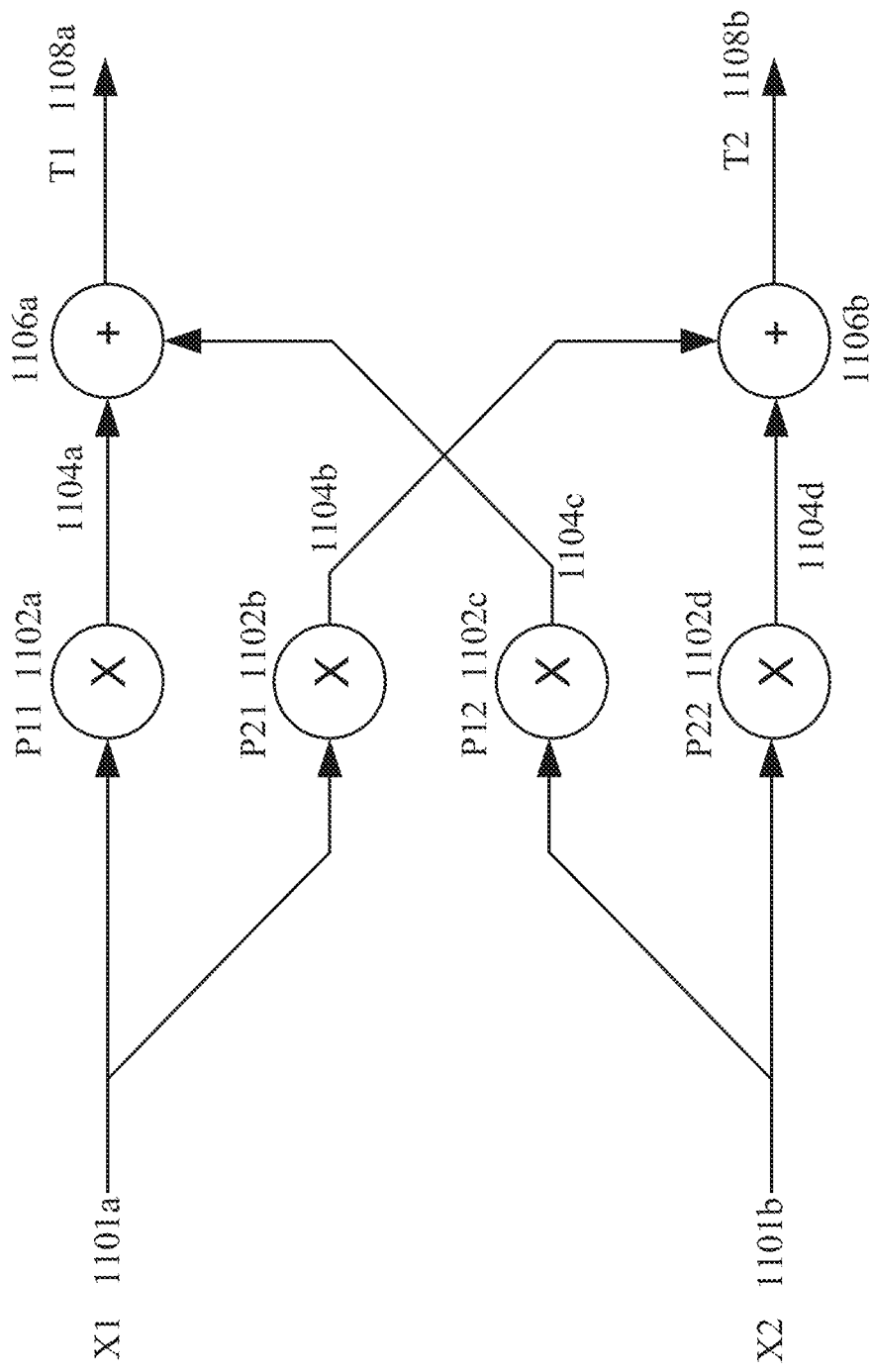
FIG. 11 is a simplified schematic illustration of structure of a pre-coder according to an example embodiment of the invention.

Reference is now made to FIG. 11, which is a simplified schematic illustration of structure of a pre-coder according to an example embodiment of the invention.

FIG. 11 depicts an example electronic circuitry which can implement multiplying input signals represented by a two-valued vector X by a four valued matrix P, producing a transmission signal represented by a two-valued vector T.

By way of a non-limiting example FIG. 11 shows a pre-coder circuit.

Two input signals X1 1101a and X2 1101b are fed into multipliers P11 1102a, P21 1102b, P12 1102c, P22 1102d, which are signal multiplying circuits. The signals X1 1101a and X2 1101b are multiplied by parameters set dynamically in the multipliers P11 1102a, P21 1102b, P12 1102c, P22 1102d, the parameters optionally corresponding to values of a pre-coder matrix P.

Four output signals 1104a 1104b 1104c 1104d are produced by the four multipliers P11 1102a, P21 1102b, P12 1102c, P22 1102d. Pairs of the output signals 1104a 1104b 1104c 1104d are added by signal adders 1106a 1106b, producing output of two signals T1 1108a and T2 1108b.

The output signals T1 1108a and T2 1108b correspond to a result of the input signals X1 1101a and X2 1101b being multiplied by a pre-coder matrix P.

The equations as developed above, up to Equation 13, show that at a specific rotation, two polarization transmissions may be isolated from each other.

By way of a non-limiting example, in FIG. 10, the pre-coding matrix canceled the rotation at the first reflection point. The pre-coding matrix actually rotated the signal in the opposite direction. As a result the covariance matrix is as in Equation 13 instead of as in the first row of the equations in Equation 8.

In some embodiments it is desired to have a covariance matrix like in Equation 13, which potentially enables a higher communication rate, and a pre-coder is optionally used to cancel some of the rotations in the channel.

A Closed Form Solution for the Rotation Matrix

An example rotation matrix of the following form is selected:

$$\underline{P} = \begin{pmatrix} \cos(\alpha) \cdot e^{i\varphi} & \sin(\alpha) \cdot e^{i\varphi} \\ -\sin(\alpha) & \cos(\alpha) \end{pmatrix} \qquad \text{Equation 14}$$

The term $\alpha$ corresponds to a rotation angle, and the term $\varphi$ corresponds to a mixing of a signal of one polarization signal with a signal of another polarization.

Optionally, the channel matrix $\underline{H}$ is estimated at a receiving side.

Since $\underline{H} = \underline{U} \underline{D} \underline{V}^H$, and we have shown that a pre-coder of the form $\underline{P} = \underline{V}$ provides a zero-forcing solution, parameters $\alpha$ and $\varphi$ are solved for, to make $\underline{P}$ equal $\underline{V}$.

Calculating the following term, it is realized that $(HV)^H (HV)$ should be diagonal:

$$(HV)^H (HV) = (UDV^H V)^H (UDV^H V) = \qquad \text{Equation 15}$$
$$(UD)^H (UD) = D^H U^H U D = D^H D = \begin{pmatrix} \lambda_1 & 0 \\ 0 & \lambda_2 \end{pmatrix}$$

Using an explicit expression for $\underline{P}$ one obtains:

$$[(\underline{HP})^H (\underline{HP})]_{1,2} = 1/2(|h_{11}|^2 - |h_{12}|^2 + |h_{21}|^2 - |h_{22}|^2) \cdot \sin(2\alpha) + (Re\{h_{11}^* h_{12} e^{-i\varphi}\} + Re\{h_{21}^* h_{22} e^{-i\varphi}\}) \cdot \cos(2\alpha) - Im\{h_{12}^* h_{11} e^{i\varphi}\} - Im\{h_{22}^* h_{21} e^{i\varphi}\} \qquad \text{Equation 16}$$

The value of Equation 16 corresponds to element 1,2 of the rotation matrix, which one optionally strives to be zero, as in Equation 15.

A solution $(\alpha, \varphi)$ which zeros the expression in Equation 16 is given by:

$$r_1 = |h_{12}^* h_{11}|; \; r_2 |h_{22}^* h_{21}| \qquad \text{Equation 17}$$
$$\theta_1 = \text{phase}\{h_{12}^* h_{11}\}; \; \theta_2 = \text{phase}\{h_{22}^* h_{21}\}$$
$$\tan(\varphi) = -\frac{r_1 \sin(\theta_1) + r_2 \sin(\theta_2)}{r_1 \cos(\theta_1) + r_2 \cos(\theta_2)}$$
$$\tan(2\alpha) = -\frac{2(Re\{h_{11}^* h_{12} e^{-i\varphi}\} + Re\{h_{21}^* h_{22} e^{-i\varphi}\})}{(|h_{11}|^2 - |h_{12}|^2 + |h_{21}|^2 - |h_{22}|^2)}$$

Equation 17 provides values for $\alpha$ and $\varphi$ for a known channel matrix. Once the values of $\alpha$ and $\varphi$ are calculated, the values of $\alpha$ and $\varphi$ may optionally be used in Equation 14 in implementing a pre-coder as depicted in FIG. 11.

An Iterative Method

Equation 17 provides an exact solution to finding parameters for a zero-forcing pre-coder.

In some embodiments, a solution may be implemented using an iterative method.

Some non-limiting example reasons for implementing using an iterative method:

An iterative solution potentially requires less calculations per iteration.

An iterative solution may be less sensitive to noise, for example in estimating the channel matrix, since the iterative solution can optionally trade speed of convergence with accuracy.

As a non-limiting example of an iterative solution we have the following set of update equations which are derived from Equation 17.

$$\varphi^{(n)} = \varphi^{(n-1)} - \mu_\varphi \cdot \frac{\text{sign}\{r_1^{(n)} \sin(\theta_1^{(n)}) + r_2^{(n)} \sin(\theta_2^{(n)})\}}{\text{sign}\{r_1^{(n)} \cos(\theta_1^{(n)}) + r_2^{(n)} \cos(\theta_2^{(n)})\}} \qquad \text{Equation 18}$$

$$\alpha^{(n)} =$$
$$\alpha^{(n-1)} - \mu_\alpha \cdot \frac{\text{sign}\{Re\{h_{11}^{*(n)} h_{12}^{(n)} e^{-i\varphi(n)}\} + Re\{h_{21}^{*(n)} h_{22}^{(n)} e^{-i\varphi(n)}\}\}}{\text{sign}\{|h_{11}^{(n)}|^2 - |h_{12}^{(n)}|^2 + |h_{21}^{(n)}|^2 - |h_{22}|^2\}}$$

The superscript n indicates an iteration number.

A Search Method for Finding a Pre-Coding Matrix

In some embodiments, such as described above, methods for finding a pre-coding matrix for communication with dual polarization over an NLOS channel used calculations of eigen-vectors.

In some embodiments, a search method is performed to find the pre-coding matrix.

The rotation matrix shown in Equation 14 has two parameters, a and cp. Search may be optionally performed for each one of $\alpha$ and $\varphi$ independently, or for both simultaneously.

Well known search methods such as the Nelder-Mead method may be used to search for parameters which increase or maximize quality parameters such as, by way of a non-limiting example, a communication rate, a sum SNR in dB (of both polarizations), or some other quality criterion.

Figure 12:
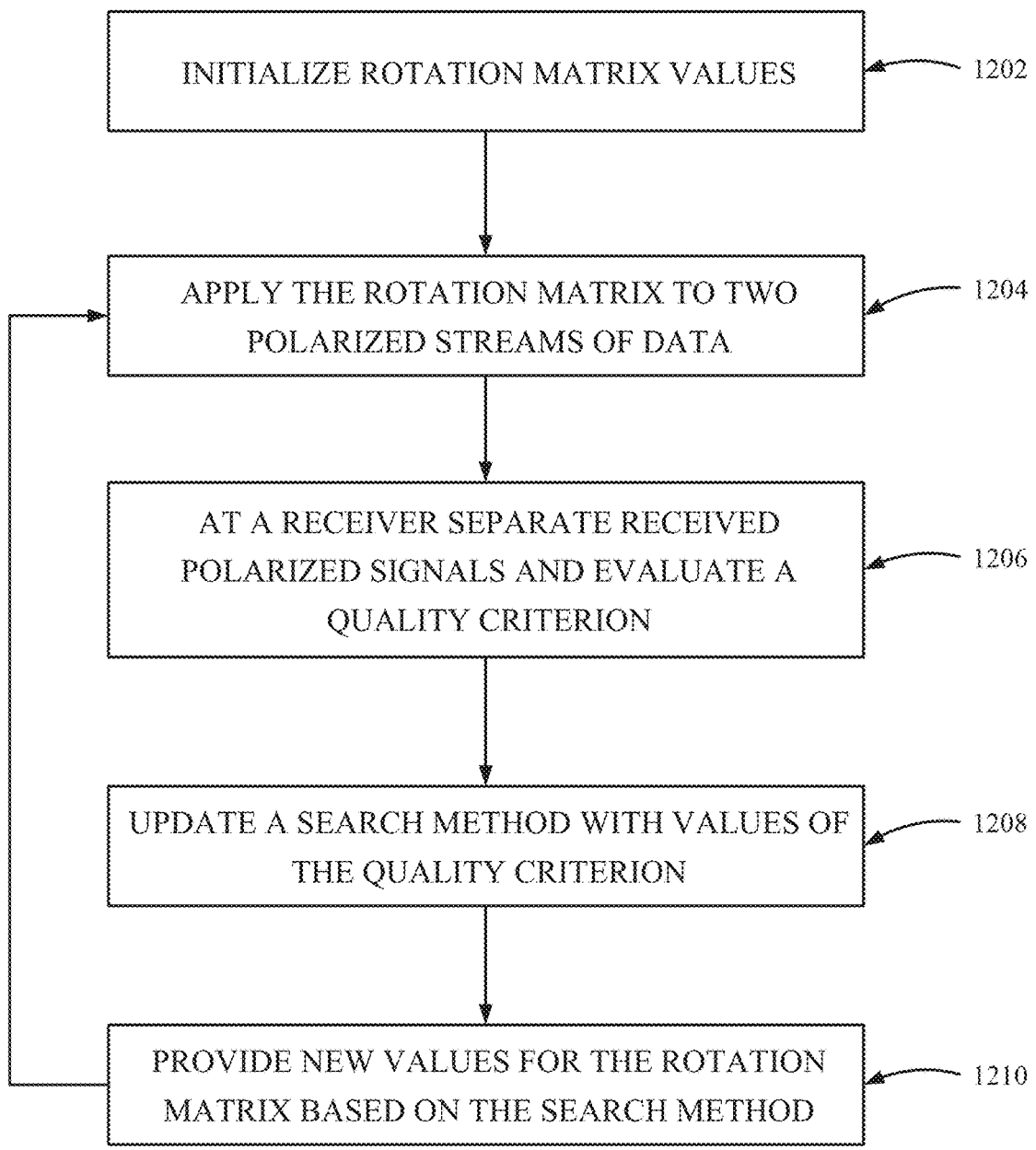
FIG. 12 is a simplified flow chart illustration of using a search method for finding a pre-coding matrix according to an example embodiment of the invention.

Reference is now made to FIG. 12, which is a simplified flow chart illustration of using a search method for finding a pre-coding matrix according to an example embodiment of the invention.

The method of FIG. 12 includes:

initializing values of a rotation matrix (1202). The initial values may be some predetermined value, such as values corresponding to $\alpha=0$ and $\varphi=0$, or some other values, or even random values;

applying the rotation matrix to two polarized streams of data (1204);

at a receiver, separating received polarized signals and evaluating a quality criterion (1206), such as, by way of a non-limiting example, sum SNR in dB of the two separated received polarized signals, or some other quality criterion;

updating a search method with one or more values of the quality criterion (1208); and providing new values for the rotation matrix based on the search method (1210).

A Search Method for a Pre-Coding Matrix with Non-Orthogonal Polarizations

An optimal rotation matrix as described by Equation 14 optionally transmits one stream of data along a best polarization of the channel, and another stream of data along a worst polarization of the channel. Such transmission theoretically provides a highest total capacity (or sum SNR in dB). Such transmission also implies that one stream of data will have a relatively very high SNR, and the other—a relatively low SNR.

A communication system may not always be able to take advantage of the relatively very high SNR or the relatively low SNR.

For example—

When the high SNR is much higher than required for communicating at a highest rate supported by the system.

When the low SNR is much lower than the minimal SNR required by the system.

In such cases, in some embodiments, the high SNR may optionally be decreased, and the low SNR may optionally be increased. In such embodiments, the following pre-coding matrix may optionally be used:

$$\underline{P} = \begin{pmatrix} \cos(\alpha-\delta) \cdot e^{i\varphi} & \sin(\alpha-\delta) \cdot e^{i\varphi} \\ -\sin(\alpha+\delta) & \cos(\alpha+\delta) \end{pmatrix} \quad \text{Equation 18a}$$

Equation 18a is similar to Equation 14 with an additional parameter $\delta$.

When $\delta \neq 0$ the signals transmitted at the two polarizations become correlated, and orthogonality is not maintained. However, a potential benefit of using such a pre-coding matrix is that the pre-coding matrix enables splitting total transmitted power unevenly between the two streams. At the same time transmitted power per polarization does not change.

A power gain of the first stream is $-\cos^2(\alpha-\delta)+\sin^2(\alpha+\delta)$, while the power gain of the second stream is $\cos^2(\alpha+\delta)+\sin^2(\alpha-\delta)$. The gains are generally different, and potentially enable taking some power from one stream and giving it to the other.

The power gain per polarization is:

$$\cos^2(\alpha-\delta)+\sin^2(\alpha-\delta)=\cos^2(\alpha+\delta)+\sin^2(\alpha+\delta)=1$$

So the transmitted power per polarization remains unchanged.

Finding an optimal value of $\delta$ may optionally be done using the search method presented in the above section titled "A search method for finding a pre-coding matrix".

The method requires two steps:
Find parameters $(\alpha,\varphi)$ of the pre-coding matrix, using either the direct SVD, the closed-form solution, the iterative solution or the search algorithm.
Search for an optimal parameter $\delta$ using the search method starting from $\delta=0$.

In some embodiments:
The search method may be applied directly on all parameters $(\alpha,\varphi,\delta)$.
Searching may optionally start from a random value of $\delta$.
Pre-Coding with an Optimal Pre-Coding Matrix This term optimal pre-coding matrix is used in a sense of maximizing mutual information between a transmitter and a receiver, under a constraint that the total transmitted power (or both polarizations) is limited.

It is noted that mutual information is a term from the field of information theory. In simple words, the term denotes an amount of information we can learn about transmitted data from received data for a given modulation scheme and a channel, e.g. 256 QAM with a Gaussian noise of some power. Determining and/or using a rotation matrix that maximizes the mutual information, means that we can learn more information about the transmitted data from the received data. When measuring in bits, this implies we can transmit more bits of information.

For a Gaussian noise channel an expression that needs to be maximized is:

$$C = \max_{Q; tr\{Q\} \leq P_T} \{\log_2(\det(I + \rho \underline{H Q H}^H))\} \quad \text{Equation 19}$$

In Equation 19 $\underline{Q}=\underline{P}^H \underline{P}$ and $\underline{P}$ is the notation for the pre-coding matrix; and $\rho$ denotes the channel SNR. A limitation on the trace (tr(Q)) guarantees that the pre-coding matrix does not amplify total transmitted power.

$\underline{Q}$ is represented in the space spanned by matrix $\underline{V}$, which is associated with the channel matrix: $\underline{Q}=\underline{VSV}^H$. The matrix $\underline{S}$ is diagonal. Finding a $\underline{Q}$ that maximizes mutual information is equivalent to finding $\underline{S}$.

Using the relation $\underline{Q}=\underline{VSV}^H$ we obtain the following expression for the channel capacity:

$$C = \max_{S; tr\{S\} \leq \mu} \{\log_2(\det(I + \rho DSD^H))\} \quad \text{Equation 20}$$

The derivation is as follows:

$$\det(I+\rho HQH^H)=\det(I+\rho UDV^H VSV^H VD^H U^H)=\det(I+\rho USDS^H U^H)=\det(UU^H+\rho USDS^H U^H)=\det(U(I+\rho DSD^H)U^H)=\det(I+\rho DSD^H) \quad \text{Equation 21}$$

The determinant of Equation 21 may be expressed as follows:

$$\det(I+\rho DSD^H)=(1+\rho \lambda_1 s_1)(1+\rho \lambda_2 s_2) \quad \text{Equation 22}$$

A solution for maximizing Equation 16 under a constraint of $s_1+s_2 \leq P_T$ is a method named the "water pouring" algorithm:

$$s_i = \begin{cases} \mu - \frac{1}{\rho \lambda_i} & \text{if } \mu - \frac{1}{\rho \lambda_i} > 0 \\ 0 & \text{otherwise} \end{cases} \quad \text{Equation 23}$$

$\mu$ is selected such that $s_1+s_2=P_T$

Equation 23, which maximizes the capacity of the channel under a constraint over the total transmitted power, uses knowledge of the channel singular values and of the channel SNR.

Figure 13A:
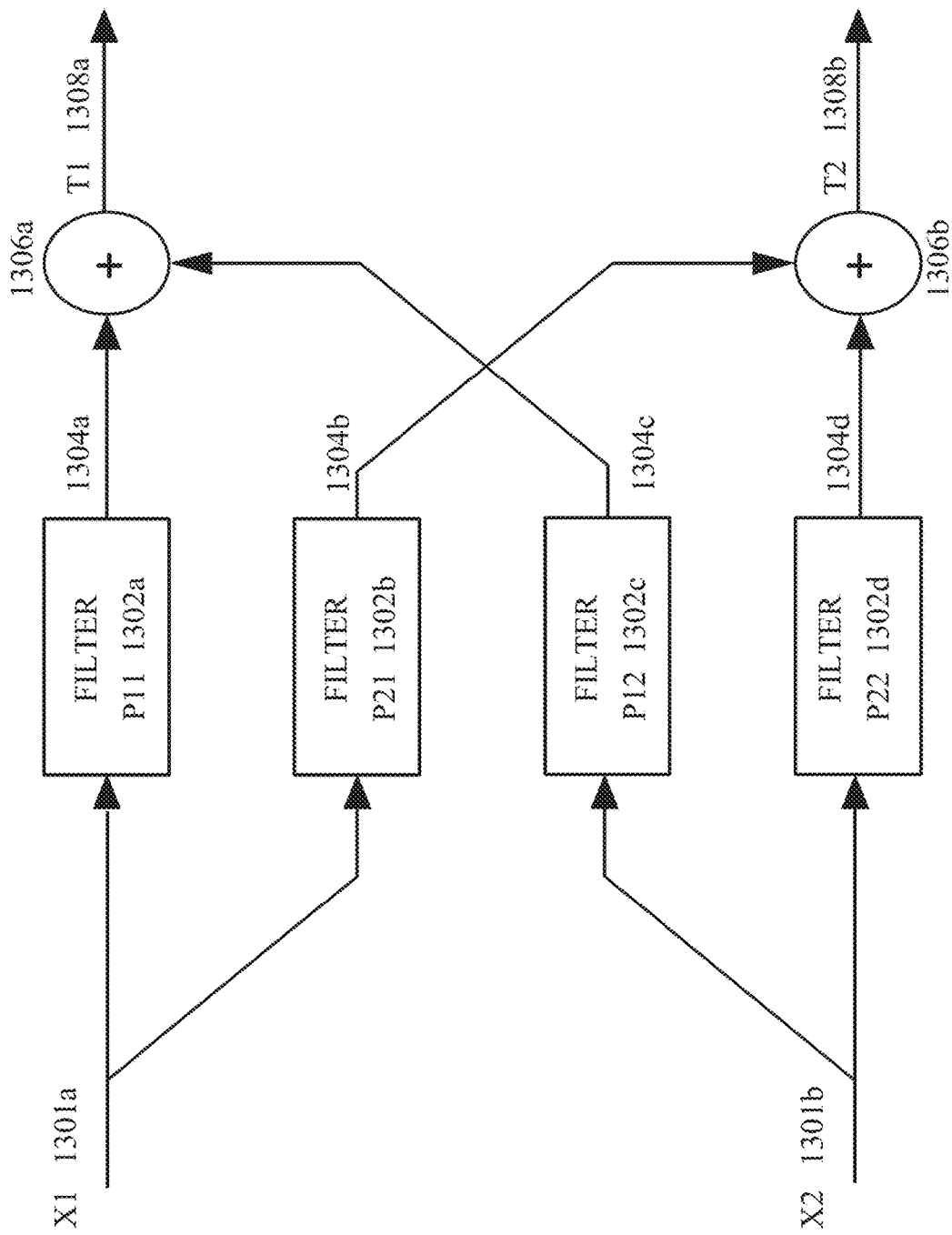
FIG. 13A is a simplified schematic illustration of structure of a pre-coder implementing a filtering according to an example embodiment of the invention.

When a channel matrix depends on frequency, the pre-coding matrix is optionally replaced by a filtering matrix, as shown in FIG. 13A.

Reference is now made to FIG. 13A, which is a simplified schematic illustration of structure of a pre-coder implementing a filtering according to an example embodiment of the invention.

FIG. 13A depicts an example electronic circuitry which can implement filtering input signals represented by a two-valued vector X by a four filters, producing a transmission signal represented by a two-valued vector T.

Two input signals X1 1301*a* and X2 1301*b* are fed into filters P11 1302*a*, P21 1302*b*, P12 1302*c*, P22 1302*d*. The signals are filtered, producing output of four output signals 1304*a* 1304*b* 1304*c* 1304*d*. Pairs of the output signals 1304*a* 1304*b* 1304*c* 1304*d* are added by signal adders 1306*a* 1306*b*, producing output of two signals T1 1308*a* and T2 1308*b*.

When a channel response depends on frequency, the following is optionally performed:
Obtaining a frequency response of a dual polarization channel
Calculating parameter values for the pre-coding filters Reference is now made to FIG. 13B, which is a simplified line drawing illustration of an example embodiment which may be used to construct the filter 1302 of FIG. 13A according to an example embodiment of the invention.

Figure 13B:
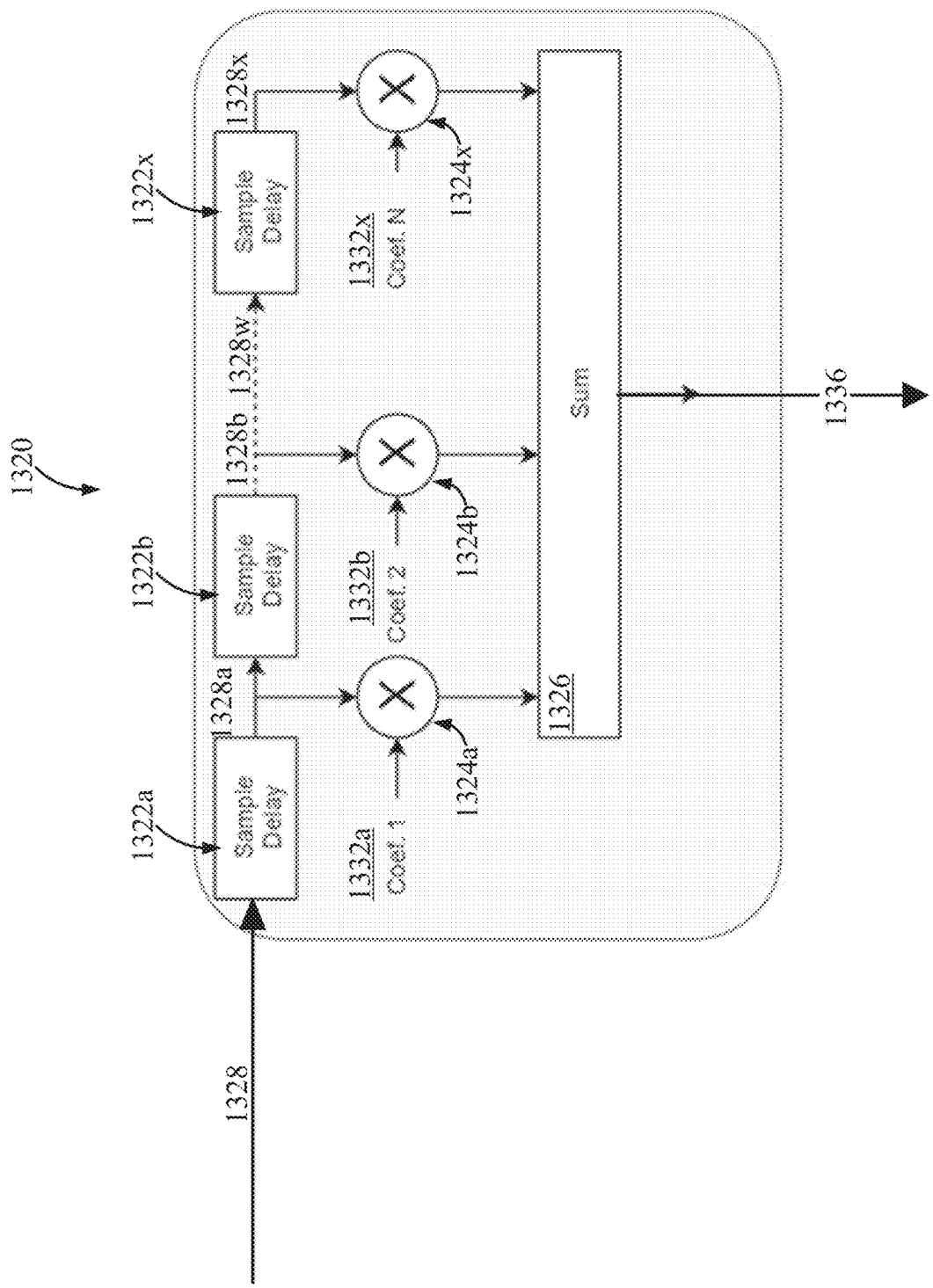
FIG. 13B is a simplified line drawing illustration of an example embodiment which may be used to construct the filter of FIG. 13A according to an example embodiment of the invention.

FIG. 13B shows a filter 1320 including delay units 1322*a* 1322*b* 1322*x*, multipliers 1324*a* 1324*b* 1324*x*, and a summing unit 1326.

A signal 1328 entering the filter 1320 is optionally delayed by a first delay unit 1322*a*, producing a first delayed signal 1328*a*.

The first delayed signal 1328*a* is optionally multiplied by a first coefficient 1332*a*, producing an output 1334*a*, which is optionally fed into the summing unit 1326.

The first delayed signal 1328*a* is optionally delayed by a second delay unit 1322*a*, producing a second delayed signal 1328*b*.

The second delayed signal 1328*b* is optionally multiplied by a second coefficient 1332*b*, optionally different from the first coefficient 1332*a*, producing an output 1334*b*, which is optionally fed into the summing unit 1326.

The delaying, multiplying, and feeding as input into the summing unit 1326 are optionally repeated more times, for example until:

A delayed signal 1328*w* is optionally delayed by a delay unit 1322*x*, producing a delayed signal 1328*x*.

The delayed signal 1328*x* is optionally multiplied by a coefficient 1332*x*, optionally different from at least some of the other coefficients, producing an output 1334*x*, which is optionally fed into the summing unit 1326.

Finally, the summing units sums its inputs 1334*a* 1334*b* ... 1334*x*, producing an out signal 1336.

It is noted that there are different ways to implement filters, and FIG. 13B is one example. FIG. 13B is intended to demonstrate a filter which is optionally is associated with a frequency response, that is, at each frequency the filter multiplies the input signal at the frequency by a complex number such as used in the matrix representation in the equations above.

In some embodiments there are filters with few delays and filters with hundreds of delays. By way of a non-limiting example a system with 16 delay units was simulated by the present inventors. The number of delay units (and coefficients) typically depends on a complexity of a communication channel. The more coefficients are used, the better the control of the frequency response. However, in some embodiments the number of coefficients can be as low as 2.

Obtaining a Channel Frequency Response

Obtaining a channel frequency response is equivalent to obtaining an impulse response of a channel, since the terms are related to each other via a Fourier transform. An impulse response of a channel may be a scalar value in case the channel has a flat frequency response, or a vector otherwise.

In some embodiments, obtaining the impulse response is done by sending a sequence of symbols Si from a transmitter associated with a polarization i. A receiver which is associated with a polarization k correlates received samples with a sequence Pk,i. Correct construction of the sequences of symbols generates the impulse response from polarization i to polarization k at a correlator output, while zeroing interference from a transmitter associated with polarization j≠i which transmitted sequence Sj simultaneously.

Details of symbol sequence construction are available in above-mentioned U.S. Pat. No. 9,203,484 titled "Using Sequences for Symbol Timing Synchronization in Single-Carrier MIMO Communication Systems".

Calculating Pre-Coding Filter Parameters

For a case of a non-flat channel response the channel matrix is split into a number of approximately flat channel matrices, and a corresponding pre-coding matrix is calculated for the obtained matrices.

Figure 14:
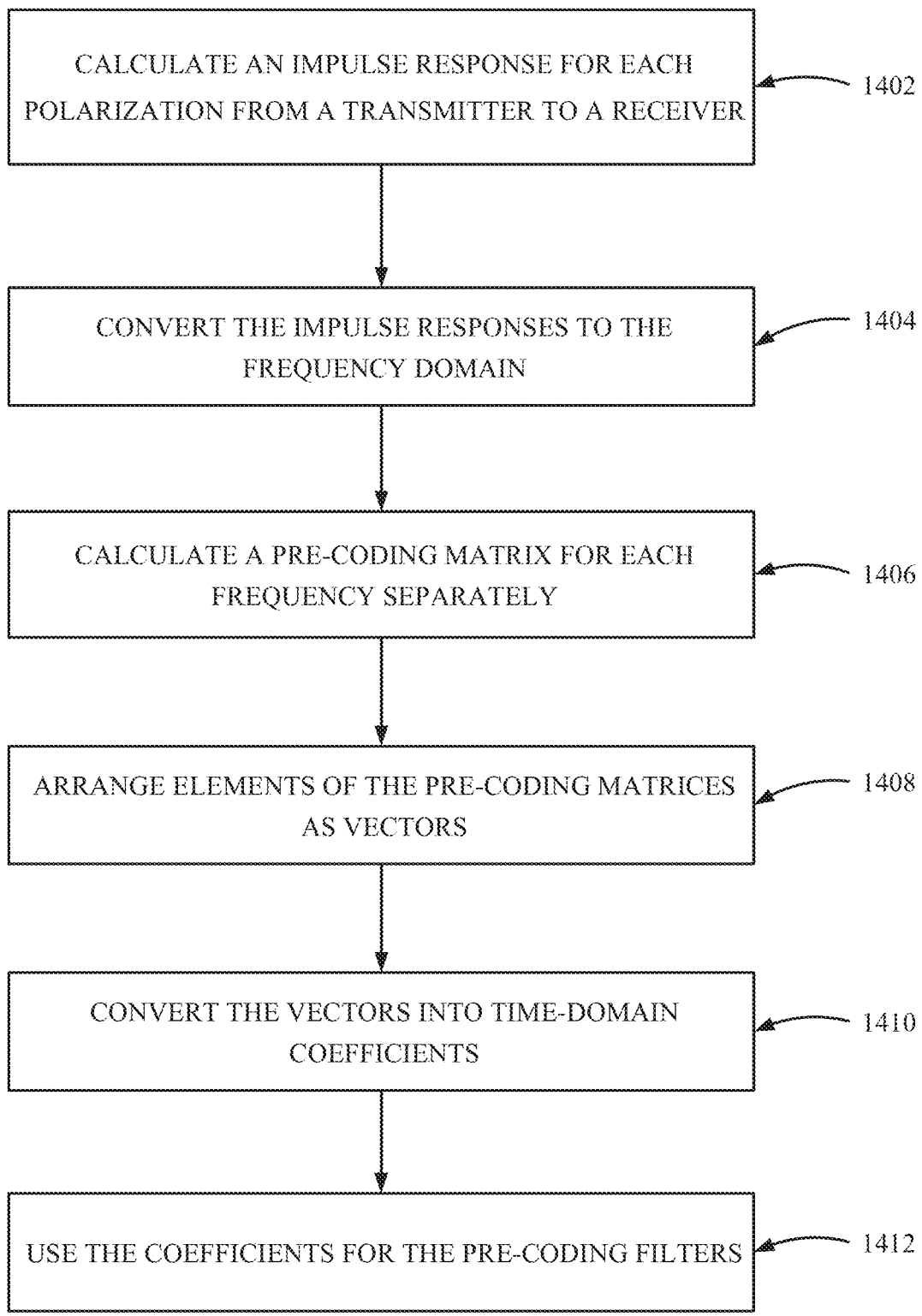
FIG. 14 is a simplified flow chart illustration of a method for obtaining coefficients for pre-coding filters according to an example embodiment of the invention.

FIG. 14 demonstrates such an example procedure.

Reference is now made to FIG. 14, which is a simplified flow chart illustration of a method for obtaining coefficients for pre-coding filters according to an example embodiment of the invention.

The method of FIG. 14 includes:

Calculating an impulse response for each polarization from a transmitter to a receiver (1402);

Converting the impulse responses to the frequency domain (1404). The converting may be done by a Fourier transform, or by any other time-domain to frequency-domain transform;

Calculating a pre-coding matrix for each frequency separately (1406). Any of the methods described above may optionally be used for calculating the pre-coding matrix. The pre-coding matrices are typically 2×2 matrices. The methods include the matrix rotation solution, which may be calculated directly by performing SVD on the matrices, or using a rotation matrix with a closed form expression, or a rotation matrix obtained iteratively based on previously obtained pre-coding matrices, or an optimal matrix;

Arranging elements of the pre-coding matrices as vectors (1408) which will be converted to a set of coefficients for the pre-coding filters. the matrices are optionally arranged as four vectors;

Converting the vectors into time-domain coefficients (1410). The converting is optionally performed as follows:
an arbitrary delay is selected, which is optionally half a length of the pre-coding FIR (finite impulse response) filters. The arbitrary delay is converted to a frequency response;
multiply the frequency response of the delayed impulse, element by element, by the frequency responses obtained in (1408). A delay of the pre-coding filters is thus defined. After introducing the delay the frequency responses are converted to the time domain. The converting may be done by a Fourier transform, or by any other time-domain to frequency-domain transform;

Using the coefficients of (1410) for the pre-coding filters, optionally as shown in FIG. 13A.

Systems Communicating with One Polarization

The section describing pre-coding with a rotation matrix has shown that a channel may favor one polarization. A favored polarization may be a polarization associated with the larger eigen-value of the associated channel matrix.

Using a rotation matrix as a pre-coder potentially guarantees that a communication system will split data to be communicated in such a way that part of the data is transmitted over a favorable polarization, and the rest on an orthogonal polarization, which may be a less favorable polarization, even the worst possible polarization.

In some embodiments, for systems communicating with a single polarization, the favorable polarization is used.

The embodiments described herein discover the favorable polarization, and the orthogonal polarization.

After discovering such polarizations, a communication system may optionally apply rotation to a single stream of data, with a single polarization, such that the single stream is transmitted over the favorable polarization, and hence improve communication quality relative to an NLOS system which is not aware of the favorable polarization and/or does not rotate the transmitted signal to the favorable polarization.

It is expected that during the life of a patent maturing from this application many relevant polarizing antennas and pre-coding filters will be developed and the scope of the terms polarizing antenna and pre-coding filter are intended to include all such new technologies a priori.

As used herein the term "about" refers to ±10%.

The terms "comprising", "including", "having" and their conjugates mean "including but not limited to".

The term "consisting of" is intended to mean "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a unit" or "at least one unit" may include a plurality of units, including combinations thereof.

The words "example" and "exemplary" are used herein to mean "serving as an example, instance or illustration". Any embodiment described as an "example or "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for optimizing reception of a polarized single-carrier transmission, comprising:
    transmitting a polarized single-carrier transmission to a receiver;
    receiving feedback from the receiver of a figure of merit of the polarized single-carrier transmission; and
    electronically changing polarization of the transmitting of the polarized single-carrier transmission based on the feedback from the receiver, thereby optimizing reception, by the receiver, of the polarized single-carrier transmission; and
    transmitting the polarized single-carrier transmission to the receiver using the changed polarization.

2. The method of claim 1, in which the changing polarization is performed by multiplying a vector T, of values to be transmitted, by a rotation matrix D.

3. The method of claim 1, in which the polarized single-carrier transmission comprises a single stream of data transmitted at a specific polarization.

4. The method of claim 1, in which the polarized single-carrier transmission comprises two streams of data transmitted at two different polarizations.

5. The method of claim 1, and in which the changing polarization of the polarized single-carrier transmission based on the feedback comprises multiplying values to be transmitted, represented by a vector T, by a matrix P, where rows of P are eigenvectors associated with a Singular Value Decomposition (SVD) of a matrix H comprised in feedback data from the receiver, the matrix H being defined by R=H·T+n, where:
    T is a vector representing a transmitted signal;
    R is a vector representing a signal received by the receiver; and
    n is a vector representing additive noise.

6. The method of claim 1, and in which the changing polarization of the polarized single-carrier transmission based on the feedback comprises multiplying values to be transmitted, represented by a vector T, by a matrix P, where:

$$\underline{P} = \begin{pmatrix} \cos(\alpha) \cdot e^{i\varphi} & \sin(\alpha) \cdot e^{i\varphi} \\ -\sin(\alpha) & \cos(\alpha) \end{pmatrix}; \text{ and}$$

$$\tan(\varphi) = -\frac{r_1 \sin(\theta_1) + r_2 \sin(\theta_2)}{r_1 \cos(\theta_1) + r_2 \cos(\theta_2)},$$

where:
    $\alpha$ is an angle by which the polarization is rotated;
    $\varphi$ is a measure of mixing of perpendicular components;
    $r_1 = |=h_{12}*h_{11}|$, where $h_{ij}$ is a component of a channel matrix H;
    $r_2 = |=h_{22}*h_{22}|$;

$\theta_1$=phase$\{h_{12}*h_{11}\}$; and
$\theta_2$=phase$\{h_{22}*h_{21}\}$.

7. The method of claim 1, and in which the changing polarization of the polarized single-carrier transmission based on the feedback comprises multiplying values to be transmitted, represented by a vector T, by a matrix P, where:

$$P = \begin{pmatrix} \cos(\alpha) \cdot e^{i\varphi} & \sin(\alpha) \cdot e^{i\varphi} \\ -\sin(\alpha) & \cos(\alpha) \end{pmatrix}; \text{ and}$$

$$\tan(2\alpha) = -\frac{2(Re\{h_{11}^* h_{12} e^{-i\varphi}\} + Re\{h_{21}^* h_{22} e^{-i\varphi}\})}{(|h_{11}|^2 - |h_{12}|^2 + |h_{21}|^2 - |h_{22}|^2)}$$

$\alpha$ is an angle by which the polarization is rotated;
$\varphi$ is a measure of mixing of perpendicular components; and
$h_{ij}$ is a component of a channel matrix H.

8. The method of claim 1, and in which the changing polarization of the polarized single-carrier transmission based on the feedback comprises multiplying values to be transmitter represented by a vector T, by a matrix P:

$$P = \begin{pmatrix} \cos(\alpha) \cdot e^{i\varphi} & \sin(\alpha) \cdot e^{i\varphi} \\ -\sin(\alpha) & \cos(\alpha) \end{pmatrix};$$

$$\tan(\varphi) = -\frac{r_1 \sin(\theta_1) + r_2 \sin(\theta_2)}{r_1 \cos(\theta_1) + r_2 \cos(\theta_2)}; \text{ and}$$

$$\tan(2\alpha) = -\frac{2(Re\{h_{11}^* h_{12} e^{-i\varphi}\} + Re\{h_{21}^* h_{22} e^{-i\varphi}\})}{(|h_{11}|^2 - |h_{12}|^2 + |h_{21}|^2 - |h_{22}|^2)}$$

where:
$\alpha$ is an angle by which the polarization is rotated;
$\varphi$ is a measure of mixing of perpendicular components;
$r_1 = |=h_{12}*h_{11}|$, where $h_{ij}$ is a component of a channel matrix H;
$r_2 = |=h_{22}*h_{22}|$;
$\theta_1$=phase$\{h_{12}*h_{11}\}$; and
$\theta_2$=phase$\{h_{22}*h_{21}\}$.

9. The method of claim 8 in which the values of $\varphi$ and $\alpha$ are set iteratively, such that for iteration n:

$$\varphi^{(n)} = \varphi^{(n-1)} - \mu_\varphi \cdot \frac{\text{sign}\{r_1^{(n)} \sin(\theta_1^{(n)}) + r_2^{(n)} \sin(\theta_2^{(n)})\}}{\text{sign}\{r_1^{(n)} \cos(\theta_1^{(n)}) + r_2^{(n)} \cos(\theta_2^{(n)})\}}; \text{ and}$$

$$\alpha^{(n)} = \alpha^{(n-1)} - \mu_\alpha \cdot \frac{\text{sign}\{Re\{h_{11}^{*(n)} h_{12}^{(n)} e^{-i\varphi(n)}\} + Re\{h_{21}^{*(n)} h_{22}^{(n)} e^{-i\varphi(n)}\}\}}{\text{sign}\{|h_{11}^{(n)}|^2 - |h_{12}^{(n)}|^2 + |h_{21}^{(n)}|^2 - |h_{22}|^2\}}$$

where $\mu_\varphi$ is a step size of the value $\varphi$; and
$\mu_\alpha$ is a step size of the value $\alpha$.

10. The method of claim 8, in which:
(a) $\varphi$ and $\alpha$ receive initial values;
(b) multiplying the vector T by the matrix P;
(c) at the receiver separating components of a received signal;
(d) evaluating quality measures of each one of the separated components;
(e) providing the quality measures as input to a search method;
(f) updating at least one of $\varphi$ and $\alpha$.

11. The method of claim 1, and further comprising maximizing a value C defined as follows:

$$C = \max_{Q;\{Q\} \leq P_T} \{\log_2(\det(I + \rho H Q H^H))\}$$

where:
H is a channel matrix;
P is a pre-coder matrix;
Q is $=P^H P$; and
$P_T$ is a measure of transmitted power.

12. The method of claim 1, in which the transmitting a polarized single-carrier transmission to the receiver comprises transmitting over a None-Line-Of-Sight channel.

13. A single-carrier communication transmitter comprising:
a transmission circuit for transmitting a polarized single-carrier transmission signal to a receiver;
a circuit for receiving feedback from the receiver, the feedback describing a figure of merit of a received polarized single-carrier transmission; and
a circuit for causing the transmission circuit to change polarization of the transmitting the polarized single-carrier transmission signal, based on the feedback, thereby optimizing reception, by the receiver, of the polarized single-carrier transmission.

14. A single-carrier communication system comprising:
a receiver for receiving a polarized single-carrier transmission signal, comprising:
a circuit for determining a figure of merit of the received polarized single-carrier transmission signal; and
a circuit in the receiver for transmitting feedback comprising data describing the figure of merit,
and
a transmitter comprising:
a circuit for receiving the feedback from the receiver;
a source for a polarized single-carrier transmission signal for sending the polarized single-carrier transmission signal to the receiver;
a circuit for changing polarization of the polarized single-carrier transmission signal, based on the feedback, producing a changed polarization single-carrier transmission signal; and
a circuit for transmitting the changed polarization single-carrier transmission signal to the receiver, thereby optimizing reception of the polarized single-carrier transmission signal.

* * * * *